United States Patent
Xue et al.

(10) Patent No.: US 12,075,357 B2
(45) Date of Patent: Aug. 27, 2024

(54) COMMUNICATIONS METHOD AND APPARATUS

(71) Applicant: HUAWEI TECHNOLOGIES CO., LTD., Shenzhen (CN)

(72) Inventors: Lixia Xue, Beijing (CN); Zheng Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 17/371,629

(22) Filed: Jul. 9, 2021

(65) Prior Publication Data

US 2021/0345249 A1 Nov. 4, 2021

Related U.S. Application Data

(63) Continuation of application No. PCT/CN2020/071249, filed on Jan. 9, 2020.

(30) Foreign Application Priority Data

Jan. 11, 2019 (CN) .......................... 201910028268.9

(51) Int. Cl.
*H04W 52/02* (2009.01)
*H04W 76/28* (2018.01)
*H04W 76/38* (2018.01)

(52) U.S. Cl.
CPC ....... *H04W 52/0232* (2013.01); *H04W 76/28* (2018.02); *H04W 76/38* (2018.02)

(58) Field of Classification Search
None
See application file for complete search history.

(56) References Cited

U.S. PATENT DOCUMENTS

| 10,827,487 B2 * | 11/2020 | Huang | .................. H04W 72/12 |
| 2010/0208660 A1 | 8/2010 | Ji | |

(Continued)

FOREIGN PATENT DOCUMENTS

| CN | 103238363 A | 8/2013 |
| CN | 104581908 A | 4/2015 |

(Continued)

OTHER PUBLICATIONS

Vivo, Discussion on UE adaptation to the traffic and UE power consumption characteristics. 3GPP TSG RAN WG1 Meeting #95, Spokane, USA, Nov. 12-16, 2018, R1-1812330, 7 pages.

(Continued)

*Primary Examiner* — Saumit Shah
(74) *Attorney, Agent, or Firm* — Rimon PC

(57) ABSTRACT

A communications method and apparatus are provided. The method includes: determining one or more occasions on which a first channel is sent; and sending the first channel on the one or more occasions to at least one terminal device. The first channel carries first information. The first information includes one or more information blocks. Each information block corresponds to one of the at least one terminal device. Each information block corresponds to a different terminal device. Each information block includes one first information field set that is used to indicate information about detection performed on a second channel by a terminal device corresponding to the information block in which the first information field set is located.

20 Claims, 14 Drawing Sheets

(56) References Cited

U.S. PATENT DOCUMENTS

| | | | |
|---|---|---|---|
| 2018/0234225 A1 | 8/2018 | Yokomakura et al. | |
| 2020/0092913 A1* | 3/2020 | Xu | H04W 72/0446 |
| 2021/0051759 A1* | 2/2021 | Zhou | H04W 52/0229 |
| 2021/0259044 A1* | 8/2021 | Islam | H04W 52/0229 |
| 2022/0039008 A1* | 2/2022 | Nimbalker | H04W 52/02 |

FOREIGN PATENT DOCUMENTS

| | | | |
|---|---|---|---|
| CN | 108616969 A | 10/2018 | |
| CN | 109076552 A | 12/2018 | |
| CN | 109150417 A | 1/2019 | |
| JP | 2017143574 A | 8/2017 | |
| RU | 2584570 C2 | 5/2016 | |
| RU | 2669579 C1 | 10/2018 | |
| WO | 2020060890 A1 | 3/2020 | |
| WO | 2020146499 A1 | 7/2020 | |

OTHER PUBLICATIONS

Catt, UE Power saving schemes with power saving signal/channel/procedures. 3GPP TSG RAN WG1 Meeting #94bis, Chengdu, China, Oct. 8-12, 2018, R1-1810563, 5 pages.

* cited by examiner

COMMUNICATIONS METHOD AND APPARATUS

CROSS-REFERENCE TO RELATED APPLICATIONS

This application is a continuation of International Application No. PCT/CN2020/071249, filed on Jan. 9, 2020, which claims priority to Chinese Patent Application No. 201910028268.9, filed on Jan. 11, 2019. The disclosures of the aforementioned applications are hereby incorporated by reference in their entireties.

TECHNICAL FIELD

The present invention relates to the field of communications technologies, and in particular, to a communications method and apparatus.

BACKGROUND

A packet-based data flow is usually bursty. There may be data transmitted in a period of time, but there is no data transmitted in a relatively long period of time. Therefore, in new radio (NR), a network device may configure a discontinuous reception (DRX) processing procedure for a terminal device, so that the terminal device periodically enters a sleep mode, stops monitoring a physical downlink control channel (PDCCH), and stops receiving corresponding data transmission, to reduce power consumption and save power.

In DRX, the network device may configure a DRX cycle for a terminal device in a radio resource control (RRC) connected mode. The DRX cycle includes a DRX on duration timer (DRX-onDurationTimer), a DRX inactivity timer (DRX-InactivityTimer), a DRX downlink retransmission timer (DRX-RetransmissionTimerDL), and a DRX uplink retransmission timer (DRX-RetransmissionTimerUL). When any one of the DRX-onDurationTimer, the DRX-InactivityTimer, the DRX-RetransmissionTimerDL, and the DRX-RetransmissionTimerUL runs, the terminal device is in an active time ("Active Time"). If the terminal device is in the active time, the terminal device continuously monitors a PDCCH.

In NR, the terminal device works on larger radio frequency and a larger baseband bandwidth. In a DRX cycle, the terminal device needs to first wake up from a sleep mode, enable radio frequency and baseband circuits, obtain time-frequency synchronization, and then detect a PDCCH in a time period corresponding to the DRX-onDurationTimer. These processes consume a large amount of energy. However, data transmission is usually bursty and sparse in terms of time. In the time period corresponding to the DRX-onDurationTimer, the network device may not perform data scheduling for the terminal device, but the terminal device still continuously monitors the PDCCH. Consequently, unnecessary energy consumption is caused.

SUMMARY

Embodiments of this application provide a communications method and apparatus, to resolve a problem of unnecessary energy consumption caused by monitoring a PDCCH by a terminal device when there is no data scheduling.

According to a first aspect, this application provides a communications method. The method may be applied to a network device, a chip or a chip set in a network device, or the like. The communications method includes: determining one or more occasions on which a first channel is sent; and sending the first channel on the one or more occasions to at least one terminal device, where the first channel carries first information, and the first information includes one or more information blocks, where each information block corresponds to one of the at least one terminal device, each information block corresponds to a different terminal device, each information block includes one first information field set, and the first information field set is used to indicate information about detection performed on a second channel by a terminal device corresponding to an information block in which the first information field set is located; and if the one or more information blocks are two or more information blocks, types of first information field sets included in at least two information blocks in same first information are different; and/or if the one or more occasions are two or more occasions, types of first information field sets included in information blocks that correspond to a same terminal device and that are in first information carried on first channels sent on at least two different occasions are different. Meanings, content, and the like of information fields included in first information field sets of different types are not completely the same.

In this embodiment of this application, the network device sends a same first channel to a plurality of terminal devices, to indicate information about detection performed on a second channel by the plurality of terminal devices, so that each of the plurality of terminal devices can determine, based on the received first channel, information about detection performed on a second channel by a terminal device, and the terminal device enters a sleep mode when there is no data scheduling. In this way, unnecessary energy consumption can be reduced. In addition, in this embodiment of this application, types of first information field sets included in different information blocks on the first channel sent by the network device may be different, and types of first information field sets included in a same information block on first channels sent on different occasions may also be different. Therefore, first information field sets of different types may be dynamically reused in a same information block, so that the network device can determine, based on a data scheduling status of each terminal device or a DRX timer status of each terminal device, a type of a first information field set included in a corresponding information block. In this design, flexibility and accuracy can be improved, and indication information indicating PDCCH resources required by a plurality of terminal devices may be reduced, thereby improving resource utilization efficiency on a network side, and reducing network load.

In a possible design, the first channel may be a group PDCCH.

In a possible design, the first information may be downlink control information (DCI), or may be power saving information, for example, indication information indicating a terminal device to "wake up" or "go to sleep".

In a possible design, each information block may further include a second information field, and the second information field is used to indicate a type of the first information field set. According to the foregoing design, after receiving the first channel, a terminal device may determine a type of a first information field based on the second information field in the corresponding information block, to more accurately obtain information about detection performed on a second channel.

In a possible design, first information field sets of different types may have different functions.

In a possible design, a quantity of bits in each first information field set may be the same, or a quantity of bits in each information block may be the same. In the foregoing design, first information field sets of different types may be dynamically reused.

In a possible design, when the first information field set is of a type 1, the first information field set may be used to indicate whether a terminal device performs detection on a second channel within one or more DRX cycles after an occasion on which the first channel is detected.

In a possible design, an information field included in the first information field set corresponding to the type 1 may include but is not limited to at least one of the following three information fields: an information field 1-1, an information field 1-2, and an information field 1-3. The information field 1-1 may be used to indicate configuration information of the terminal device for CSI reporting. The information field 1-2 is used to indicate a deactive/dormant SCell carrier or carrier set that needs to be activated by the terminal device to an active state. The information field 1-3 may be used to indicate a DRX cycle (which may be 0, 1, or a plurality of DRX cycles) in which detection on a PDCCH may be performed within a detection cycle of the first channel, or used to indicate one or more slots in which detection on a PDCCH may be performed within a detection cycle of the first channel.

In a possible design, when the first information field set is of a type 2, the first information field set may be used to indicate whether a terminal device stops detection on a second channel in a period of time, or whether a terminal device stops at least one timer in advance.

In a possible design, an information field included in the first information field set corresponding to the type 2 may include but is not limited to at least one of the following four information fields: an information field 2-1, an information field 2-2, an information field 2-3, and an information field 2-4. The information field 2-1 may indicate whether to stop the at least one timer in advance. The information field 2-2 may be used to indicate an SCell carrier or carrier set whose state needs to be switched from active to deactive/dormant by the terminal device. The information field 2-3 may be used to indicate that the terminal device does not perform detection on a PDCCH in a first time period, or may be used to indicate that the terminal device enters a sleep mode in a first time period. The first time period may be a length of a detection cycle of the first channel, in other words, a length of a time interval between adjacent occasions of the first channel. The information field 2-4 may be used to indicate a length of a continuous time period in which the terminal device does not perform detection on a PDCCH, or a length of a sleep time (sleep time or sleep duration).

In a possible design, the period of time may be the detection cycle of the first channel, or the period of time may be the sleep time. The sleep time (or sleep duration) may be configured by the network device for the at least one terminal device by using higher layer signaling.

In a possible design, the at least one timer is a DRX-InactivityTimer.

In a possible design, the at least one timer may further include at least one of a DRX-InactivityTimer, a DRX-RetransmissionTimerDL, and a DRX-RetransmissionTimerUL.

In a possible design, when the first information field set is of a type 3, the first information field set may be used to indicate whether a terminal device performs detection on a second channel within a DRX cycle including an occasion on which the first channel is detected, or whether a terminal device stops a first timer in advance.

In a possible design, an information field included in the first information field set corresponding to the type 3 may include but is not limited to at least one of the following three information fields: an information field 3-1 and an information field 3-2. For the information field 3-1, refer to the information field 1-1. For the information field 3-2, refer to the information field 1-3.

For the information field 3-2, an indicated DRX includes a DRX cycle including the occasion of the first channel.

In a possible design, the first information may further include a third information field, and the third information field is used to indicate a terminal device corresponding to an information block included in the first information, and/or a location, in the first information, of an information block corresponding to the at least one terminal device. According to the foregoing design, after receiving the first channel, a terminal device may determine a location of a corresponding information block based on the third information field on the first channel, so that the terminal device can relatively accurately obtain information about detection performed on a second channel by a terminal device, thereby improving efficiency in reducing power consumption.

In a possible design, the third information field may be used to indicate an index number of the terminal device corresponding to the information block included in the first information, and a location, in the first information, of an information block corresponding to each terminal device is determined based on an index number of each terminal device. According to the foregoing design, after receiving the first channel, a terminal device may not only determine, based on the third information field on the first channel, whether the first channel includes an information block corresponding to the terminal device, but also determine a location of the corresponding information block, so that the terminal device can relatively accurately obtain information about detection performed on a second channel by a terminal device, thereby improving efficiency in reducing power consumption.

In a possible design, the at least one terminal device is a part of N terminal devices; and/or a quantity of the at least one terminal device is less than or equal to a quantity of information blocks that can be carried in the first information, and the quantity of information blocks that can be carried in the first information is less than or equal to N, where the N terminal devices perform detection on a same first channel. Usually, the network device does not need to indicate first information of all terminal devices in a cell. A quantity of bits carried in the first information is limited, and an excessively large quantity of bits carried in the first information affects coverage performance of the first channel, and increases complexity of performing detection on the first channel by a terminal device. In the foregoing design, the first channel is used to indicate a part of the N terminal devices, so that bits of a controlled quantity of the first information can be carried, to improve coverage performance of the first channel, and reduce complexity of performing detection on the first channel by the terminal device.

According to a second aspect, this application provides a communications method, including: receiving a first channel on one or more occasions from a network device, where the first channel carries first information, and the first information includes one or more information blocks, where each information block corresponds to one terminal device, each information block corresponds to a different terminal device, each information block includes one first information field set, and the first information field set is used to indicate information about detection performed on a second channel by a terminal device corresponding to an information block in which the first information field set is located; and if the one or more information blocks are two or more information blocks, types of first information field sets included in at least two information blocks in same first information are different; and/or if the one or more occasions are two or more occasions, types of first information field sets included in information blocks that correspond to a same terminal device and that are in first information carried on first channels sent on at least two different occasions are different; and determining, based on the first information, the information about detection performed on a second channel by a terminal device.

In this embodiment of this application, the network device sends a same first channel to a plurality of terminal devices, to indicate information about detection performed on a second channel by the plurality of terminal devices, so that each of the plurality of terminal devices can determine, based on the received first channel, information about detection performed on a second channel by a terminal device, and the terminal device enters a sleep mode when there is no data scheduling. In this way, unnecessary energy consumption can be reduced. In addition, in this embodiment of this application, types of first information field sets included in different information blocks on the first channel sent by the network device may be different, and types of first information field sets included in a same information block on first channels sent on different occasions may also be different. Therefore, first information field sets of different types may be dynamically reused in a same information block, so that the network device can determine, based on a data scheduling status of each terminal device or a DRX timer status of each terminal device, a type of a first information field set included in a corresponding information block. In this design, flexibility and accuracy can be improved, and indication information indicating PDCCH resources required by a plurality of terminal devices may be reduced, thereby improving resource utilization efficiency on a network side, and reducing network load.

In a possible design, each information block may further include a second information field, and the second information field is used to indicate a type of the first information field set. According to the foregoing design, after receiving the first channel, a terminal device may determine a type of a first information field based on the second information field in the corresponding information block, to more accurately obtain information about detection performed on a second channel.

In a possible design, a quantity of bits in each first information field set may be the same, or a quantity of bits in each information block may be the same. In the foregoing design, first information field sets of different types may be dynamically reused.

In a possible design, when the first information field set is of a type 1, the first information field set may be used to indicate whether a terminal device performs detection on a second channel within one or more discontinuous reception DRX cycles after an occasion on which the first channel is detected.

In a possible design, an information field included in the first information field set corresponding to the type 1 may include but is not limited to at least one of the following three information fields: an information field 1-1, an information field 1-2, and an information field 1-3. The information field 1-1 may be used to indicate configuration information of the terminal device for CSI reporting. The information field 1-2 is used to indicate a deactive/dormant SCell carrier or carrier set that needs to be activated by the terminal device to an active state. The information field 1-3 may be used to indicate one or more DRX cycles in which detection on a PDCCH may be performed within a detection cycle of the first channel.

In a possible design, when the first information field set is of a type 2, the first information field set may be used to indicate whether a terminal device stops detection on a second channel in a period of time, or whether a terminal device stops at least one timer in advance.

In a possible design, an information field included in the first information field set corresponding to the type 2 may include but is not limited to at least one of the following four information fields: an information field 2-1, an information field 2-2, an information field 2-3, and an information field 2-4. The information field 2-1 may also indicate whether to stop the at least one timer in advance. The information field 2-2 may be used to indicate an SCell carrier or carrier set whose state needs to be switched from active to deactive/dormant by the terminal device. The information field 2-3 may be used to indicate that the terminal device does not perform detection on a PDCCH in a first time period, or may be used to indicate that the terminal device enters a sleep mode in a first time period. The information field 2-4 may be used to indicate a length of a continuous time period in which the terminal device does not perform detection on a PDCCH, or a length of a sleep time (or sleep duration).

In a possible design, the period of time may be the detection cycle of the first channel, or the period of time may be the sleep time. The sleep time may be configured by the network device for the at least one terminal device by using higher layer signaling.

In a possible design, the at least one timer may include at least one of a DRX-onDurationTimer, a DRX-InactivityTimer, a DRX-RetransmissionTimerDL, and a DRX-RetransmissionTimerUL.

In a possible design, when the first information field set is of a type 3, the first information field set may be used to indicate whether a terminal device performs detection on a second channel within a DRX cycle including an occasion on which the first channel is detected, or whether a terminal device stops a first timer in advance.

In a possible design, an information field included in the first information field set corresponding to the type 3 may include but is not limited to at least one of the following three information fields: an information field 3-1 and an information field 3-2. The information field 3-1 is similar to or the same as the information field 1-1, and the information field 3-2 is similar to or the same as the information field 1-3. For the information field 3-2, an indicated DRX includes a DRX cycle including the occasion of the first channel.

In a possible design, the first information may further include a third information field, and the third information field is used to indicate a terminal device corresponding to an information block included in the first information, and/or a location, in the first information, of an information block corresponding to a terminal device. According to the foregoing design, after receiving the first channel, a terminal device may determine a location of a corresponding information block based on the third information field on the first channel, so that the terminal device can relatively accurately obtain information about detection performed on a second channel by a terminal device, thereby improving efficiency in reducing power consumption.

In a possible design, the third information field may be used to indicate an index number of the terminal device corresponding to the information block included in the first information, and a location, in the first information, of an information block corresponding to each terminal device is determined based on an index number of each terminal device. According to the foregoing design, after receiving the first channel, a terminal device may not only determine, based on the third information field on the first channel, whether the first channel includes an information block corresponding to the terminal device, but also determine a location of the corresponding information block, so that the terminal device can relatively accurately obtain information about detection performed on a second channel by a terminal device, thereby improving efficiency in reducing power consumption.

According to a third aspect, this application provides a communications apparatus. The apparatus may be a network device, or may be a chip or a chip set in a network device, or the apparatus may be a terminal device, or may be a chip or a chip set in a terminal device. The apparatus may include a processing unit and a transceiver unit.

In a possible design, when the apparatus is a network device, the processing unit may be a processor, a processing circuit, or a circuit, and the transceiver unit may be a transceiver or a transceiver circuit. The apparatus may further include a storage unit, and the storage unit may be a memory. The storage unit is configured to store instructions, and the processing unit executes the instructions stored in the storage unit, so that the network device performs corresponding functions in the first aspect. When the apparatus is the chip or the chip set in the network device, the processing unit may be a processor or processing circuit or circuit, and the transceiver unit may be an input/output interface, a pin, a circuit, or the like. The processing unit executes instructions stored in a storage unit, so that the apparatus performs a corresponding function in the first aspect. The storage unit may be a storage unit (for example, a register or a cache) in the chip or the chip set, or may be a storage unit (for example, a read only memory or a random access memory) outside the chip or the chip set in the network device.

In a possible design, when the apparatus is a terminal device, the processing unit may be a processor, a processing circuit, or a circuit, and the transceiver unit may be a transceiver or a transceiver circuit. The apparatus may further include a storage unit, and the storage unit may be a memory. The storage unit is configured to store instructions, and the processing unit executes the instructions stored in the storage unit, so that the terminal device performs corresponding functions in the second aspect. When the apparatus is the chip or the chip set in the terminal device, the processing unit may be a processor, a processing circuit or a circuit, and the transceiver unit may be an input/output interface, a pin, a circuit, or the like. The processing unit executes instructions stored in a storage unit, so that the apparatus performs a corresponding function in the second aspect. The storage unit may be a storage unit (for example, a register or a cache) in the chip or the chip set, or may be a storage unit (for example, a read only memory or a random access memory) outside the chip or the chip set in the terminal device.

According to a fourth aspect, a communications apparatus is provided, and includes a processor, a communications interface, and a memory. The communications interface is configured to transmit information, and/or a message, and/or data between the apparatus and another apparatus. The memory is configured to store computer-executable instructions. When the apparatus runs, the processor executes the computer-executable instructions stored in the memory, so that the apparatus performs the communications method according to the first aspect or any design of the first aspect, or the second aspect or any design of the second aspect.

According to a fifth aspect, this application further provides a computer-readable storage medium. The computer-readable storage medium stores instructions; and when the instructions are run on a computer, the computer is enabled to perform the method according to the foregoing aspects.

According to a sixth aspect, this application further provides a computer program product including instructions. When the computer program product runs on a computer, the computer is enabled to perform the method according to the foregoing aspects.

DESCRIPTION OF EMBODIMENTS

To make objectives, technical solutions, and advantages of embodiments of the present invention clearer, the following clearly describes the technical solutions in the embodiments of the present invention with reference to the accompanying drawings in the embodiments of the present invention.

Figure 1:
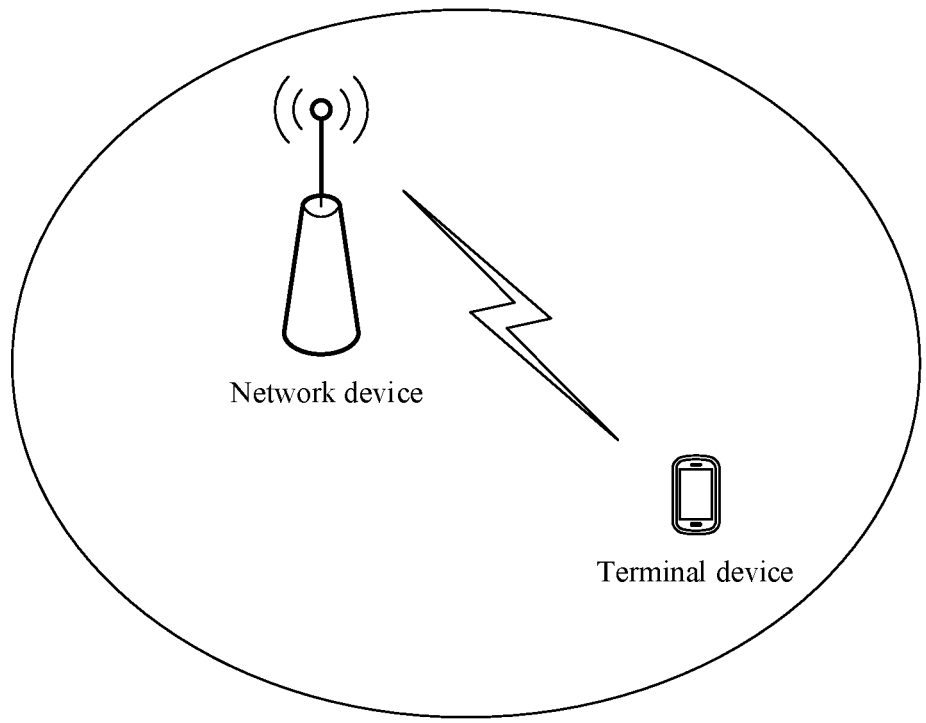
FIG. 1 is a schematic architectural diagram of a communications system according to an embodiment of this application.

A communications method provided in this application may be applied to a communications system in which a discontinuous reception (DRX) mechanism is configured. An architecture of the communications system is shown in FIG. 1, and includes a network device and a terminal device. Uplink data transmission and downlink data transmission are performed between the network device and the terminal device. In the communications system, the terminal device performs uplink data transmission based on scheduling information sent by the network device. The communications system in this embodiment of this application may be communications systems of various types, for example, may be long term evolution (LTE), may be a 5th generation (5G) communications system, may be universal terrestrial radio access (UTRA), evolved UTRA (E-UTRAN), a new radio (NR) technology, a GSM/EDGE radio access network-circuit switched (GERAN-CS) domain, a GSM/EDGE radio access network-data switched (GERAN-PS) domain, code division multiple access (CDMA) 2000-1×RTT, a multi-radio access technology dual-connectivity (MR-DC), or the like, or may be a hybrid architecture of a plurality of communications systems, for example, a hybrid architecture of LTE and 5G.

The network device may be a common base station (for example, a NodeB or an eNB), a new radio (NR) controller, a gNodeB (gNB) in a 5G system, a centralized network element (centralized unit), a new radio base station, a radio remote module, a micro base station, a relay, a distributed network element (distributed unit), a reception point (transmission reception point (TRP)), a transmission point (TP), or any other radio access device. This is not limited in this embodiment of this application.

The terminal device is also referred to as user equipment (UE), and is a device, for example, a handheld device or a vehicle-mounted device having a wireless connection function, providing voice and/or data connectivity for a user. A common terminal includes, for example, a mobile phone, a tablet, a notebook computer, a palmtop computer, a mobile internet device (MID), and a wearable device such as a smartwatch, a smart band, or a pedometer.

In the communications system, when the terminal device is in a radio resource control (RRC) connected mode, if there is no DRX mechanism, the terminal device keeps monitoring a PDCCH subframe. However, in reality, in many services, for example, a service such as web browsing, the terminal device and the network device exchange information in a specific time interval rather than all the time. If the terminal device keeps monitoring the physical downlink control channel (PDCCH), energy of the terminal device is wasted. Therefore, when effective data transmission is ensured, a DRX mechanism is designed in a wireless communications system, so that a terminal device periodically enters a sleep mode and does not monitor the PDCCH subframe at some times. When the terminal device needs to monitor the PDCCH, the terminal device is woken up from the sleep mode. Therefore, energy is saved.

Figure 2A:
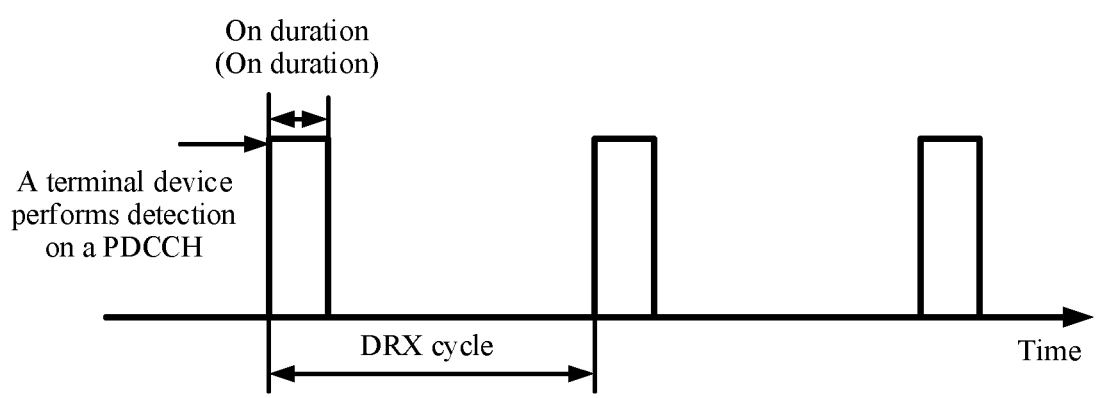
FIG. 2A is a schematic diagram of on duration according to an embodiment of this application.
Figure 2B:
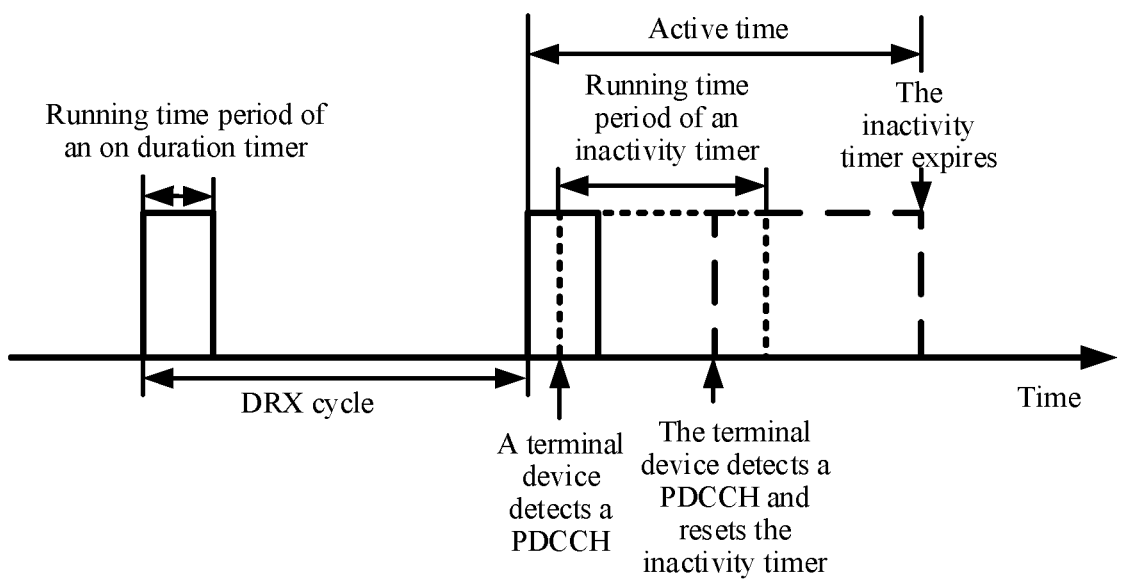
FIG. 2B is a schematic diagram of an inactivity timer according to an embodiment of this application.

In DRX, the network device may configure a DRX cycle for the terminal device in the RRC connected mode. The DRX cycle includes a time region of on duration, as shown in FIG. 2A. In the on duration, the terminal device may perform detection on a PDCCH. The terminal device enables a timer at a time start location of the on duration. A time length of the timer is a time length of the on duration. The timer may be referred to as a DRX on duration timer (DRX-onDurationTimer). The terminal device performs detection on the PDCCH within a timing range of the DRX-onDurationTimer. If the terminal device does not detect the PDCCH within the timing range of the DRX-onDurationTimer, the terminal device enters the sleep mode after the DRX-onDurationTimer expires. In other words, the terminal device may turn off a receiving circuit in a remaining time period of the DRX cycle, thereby reducing power consumption of the terminal. If the terminal device detects the PDCCH within the timing range of the DRX-onDurationTimer, the terminal device enables a DRX inactivity timer (DRX-InactivityTimer) in the DRX mechanism. If the terminal device continues to detect a PDCCH within a running time period of the DRX-InactivityTimer, the terminal device resets the DRX-InactivityTimer to start counting again. If the DRX-InactivityTimer is running, even if the originally configured DRX-onDurationTimer expires (that is, the on duration ends), the terminal device still needs to continue to perform detection on a PDCCH until the inactivity timer expires, as shown in FIG. 2B. In the DRX mechanism, there are other timers, such as a DRX downlink retransmission timer and a DRX uplink retransmission timer (DRX-RetransmissionTimerDL and DRX-RetransmissionTimerUL). When any one of the DRX-onDurationTimer, the DRX-InactivityTimer, the DRX-RetransmissionTimerDL, or the DRX-RetransmissionTimerUL runs, the terminal device is in an active time ("Active Time"). In the DRX mechanism, if the terminal device is in the active time, the terminal device continuously monitors the PDCCH.

Figure 3:
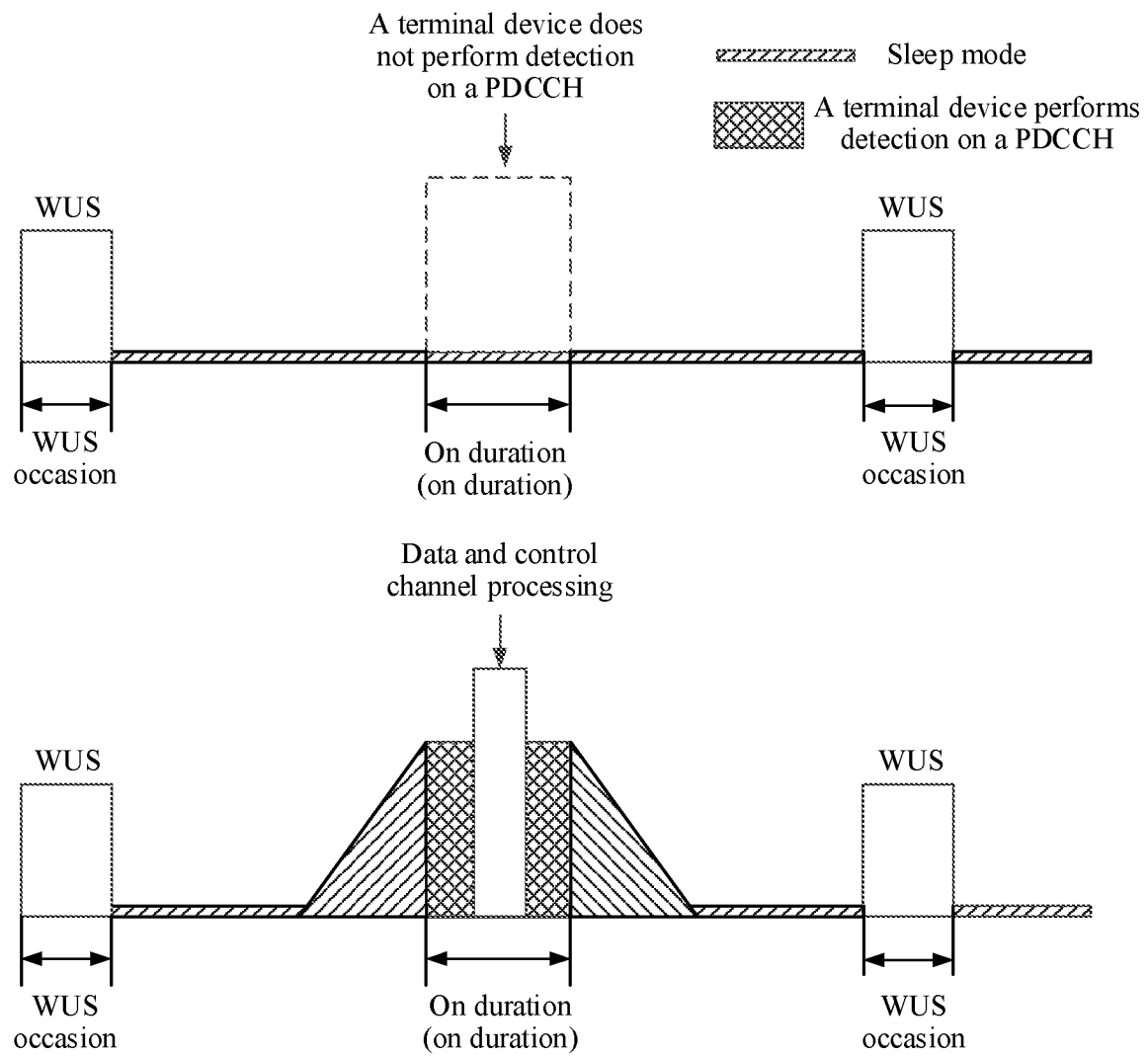
FIG. 3 is a schematic diagram of a WUS according to an embodiment of this application.

In the DRX cycle, the terminal device needs to first wake up from the sleep mode, enable radio frequency and baseband circuits, obtain time-frequency synchronization, and then perform detection on the PDCCH in the on duration period. These processes consume a lot of energy. However, data transmission is usually bursty and sparse in terms of time. If the network device does not perform data scheduling for the terminal device in the on duration period, unnecessary energy consumption is caused for the terminal device. Therefore, to reduce power consumption, a wake-up signal (WUS) may be introduced and combined with the DRX mechanism in the RRC connected mode. As shown in FIG. 3, for a terminal device that supports the WUS, for each DRX cycle, there is a WUS occasion, namely, a subframe or a slot in which the WUS is located, before the time start location of the on duration. The network device may send the WUS to the terminal device in a form of discontinuous transmission (DTX) on the WUS occasion. To be specific, the network device determines, based on a requirement for data scheduling, whether to send the WUS on the WUS occasion, and the terminal device needs to perform detection on the WUS on the WUS occasion to determine whether the network device sends the WUS. When the terminal device is in the sleep mode, the terminal device may be in a very low-power-consumption state. For example, only some functions of a modem are enabled, or a simple receiving circuit is used to detect and demodulate the WUS. When the terminal device does not detect the WUS on the WUS occasion or the detected WUS indicates that there is no data scheduling for the terminal device in the corresponding on duration period, the terminal device may directly enter the sleep mode, and does not need to perform detection on the PDCCH in the on duration period. If the terminal device detects the WUS on the WUS occasion or the detected WUS indicates that there is data scheduling for the terminal device in the corresponding on duration period, the terminal device wakes up from the sleep mode. In this case, the terminal device may start the DRX-onDurationTimer based on a DRX mechanism procedure, and perform detection on the PDCCH.

Compared with the WUS, a go to sleep (GTS) signal may be further introduced, and may also be combined with the DRX mechanism in the RRC connected mode. A GTS function may be similar to a WUS function in FIG. 3, and is used to indicate whether the terminal device enters sleep. However, an indication manner and content of the GTS are opposite to those of the WUS. If the terminal device detects the GTS on a GTS occasion or the detected GTS indicates that there is no data scheduling for the terminal device in the corresponding on duration period, the terminal device enters the sleep mode again. If the terminal device does not detect the GTS on a GTS occasion or the detected GTS indicates that there is data scheduling for the terminal device in the corresponding on duration period, the terminal device wakes up from the sleep mode.

Figure 4A:
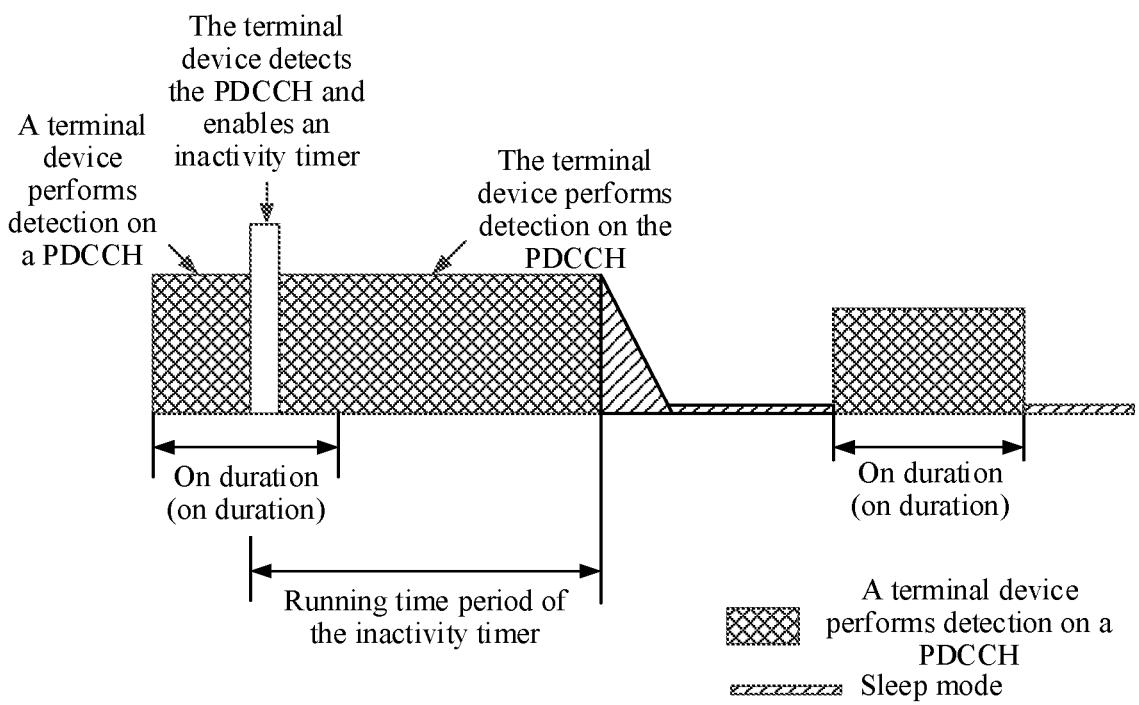
FIG. 4A is a schematic diagram of monitoring a PDCCH by a terminal device according to an embodiment of this application.
Figure 4B:
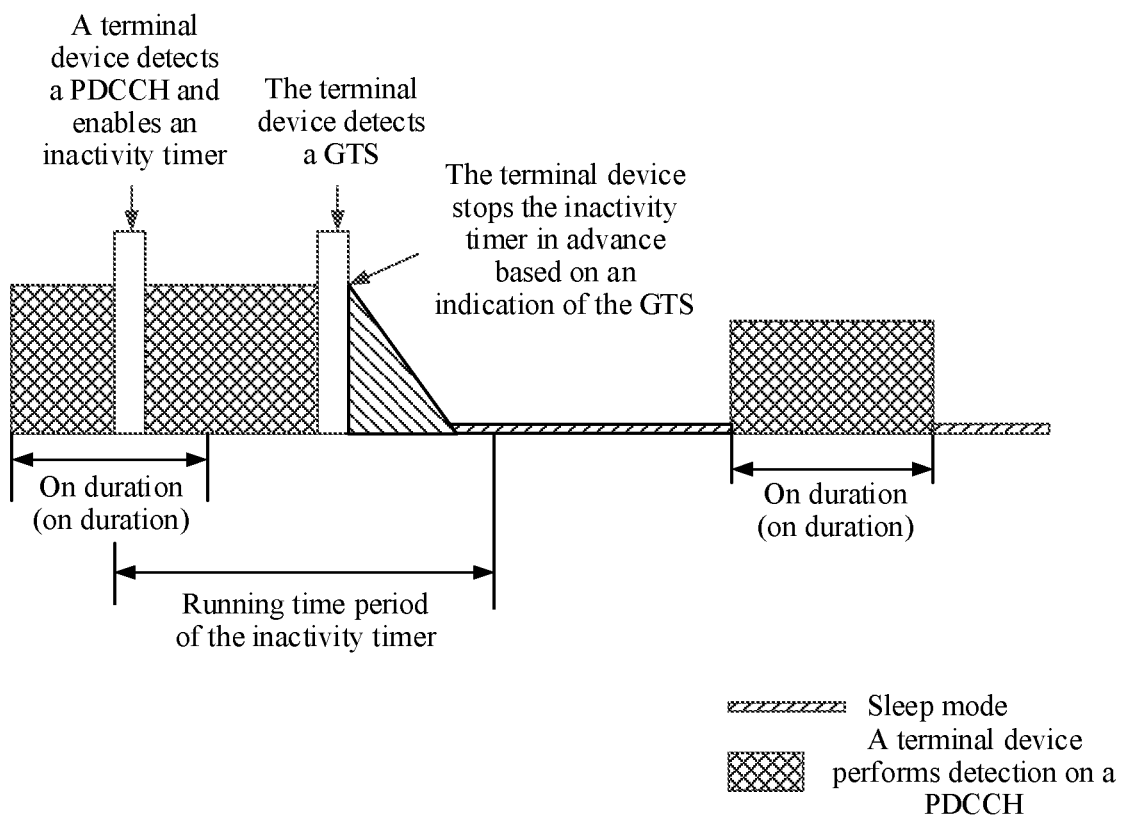
FIG. 4B is a schematic diagram of a GTS function according to an embodiment of this application.

There is another GTS function indicating whether the terminal device needs to enter the sleep mode. If the terminal device detects the PDCCH in a running time period of the DRX-onDurationTimer, the terminal device enables the DRX-InactivityTimer. Considering a delay requirement of data scheduling, the running time period of the DRX-InactivityTimer is usually much longer than the running time of the DRX-onDurationTimer. When the network device performs data scheduling for the terminal device, the terminal device enables/resets the DRX-InactivityTimer, and continues to perform detection on the PDCCH in a very long period of time. However, the network device may not perform any data scheduling for the terminal device in the period of time, as shown in FIG. 4A. In this case, unnecessary energy consumption is caused for the terminal device. In this case, if the network device determines that no data needs to be scheduled for the terminal device and no PDCCH needs to be sent to the terminal device in a remaining running time period of the DRX-InactivityTimer, the network device may send the GTS to the terminal device, to indicate the terminal device to enter the sleep mode. In this case, after detecting the GTS, the terminal device may directly stop the DRX-InactivityTimer in advance, and immediately enter the sleep mode, as shown in FIG. 4B. Alternatively, the terminal device may stop, in advance, all DRX timers (including the DRX-onDurationTimer, the DRX-InactivityTimer, and the like) related to the active time to stop detecting the PDCCH, and may enter the sleep mode.

Figure 4C:
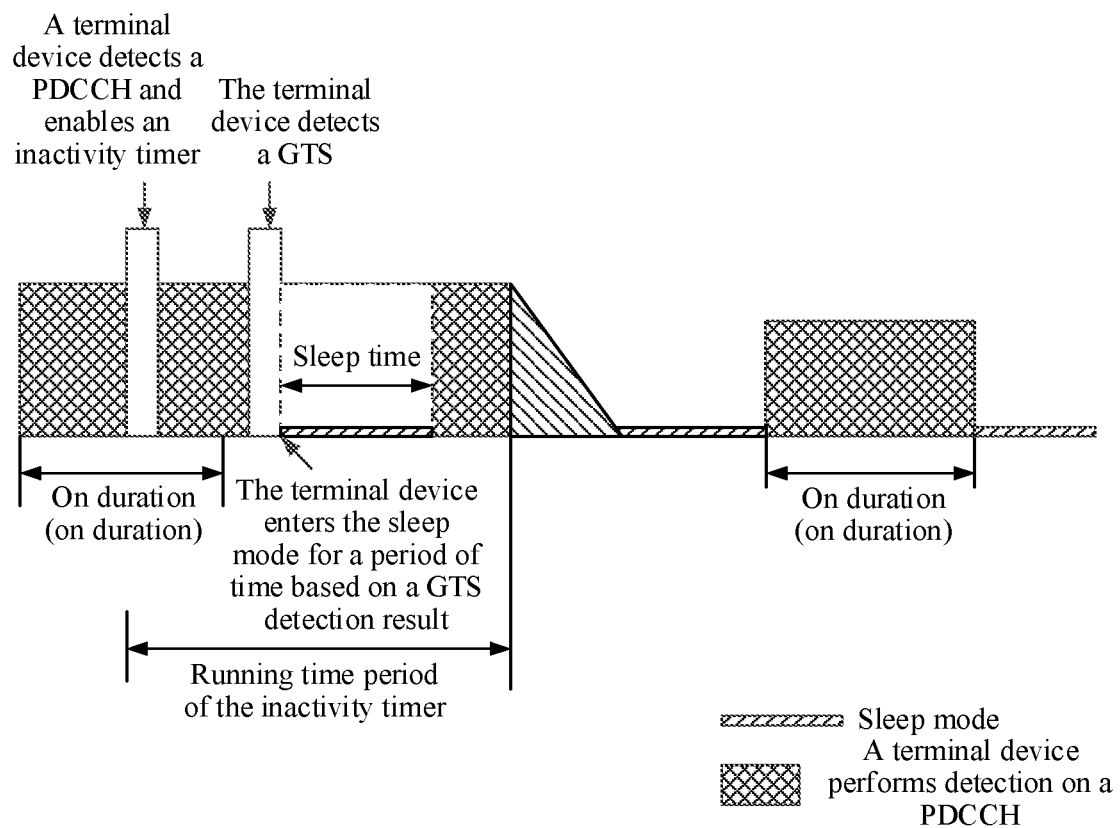
FIG. 4C is a schematic diagram of another GTS function according to an embodiment of this application.

There is still another GTS function that may indicate a sleep time (or sleep duration) of the terminal device. As shown in FIG. 4C, if the network device determines that no data needs to be scheduled for the terminal device and no PDCCH needs to be sent to the terminal device within a continuous time T in the running time period of the DRX-InactivityTimer, the network device may indicate the sleep time to the terminal device by using the GTS. After the sleep time T, the terminal device may wake up again to perform detection on the PDCCH.

For a design of the WUS/GTS, a design of a PDCCH in existing NR may be reused. In other words, the WUS/GTS is designed as a downlink control channel. In addition, a new DCI format is introduced to indicate the terminal device to "wake up" or "sleep", or indicate the terminal device to start/stop detecting the PDCCH, so that the WUS/GTS functions are implemented. In an implementation solution, a new terminal device-specific (UE-specific) DCI format is introduced to indicate the terminal device to "wake up" or "go to sleep". In other words, a corresponding PDCCH needs to be sent to each terminal device for indication. However, in this solution, the corresponding PDCCH needs to be sent to each terminal device to indicate the terminal device to "wake up" or "go to sleep". This increases resource consumption on a network side and increases network load.

Figure 5:
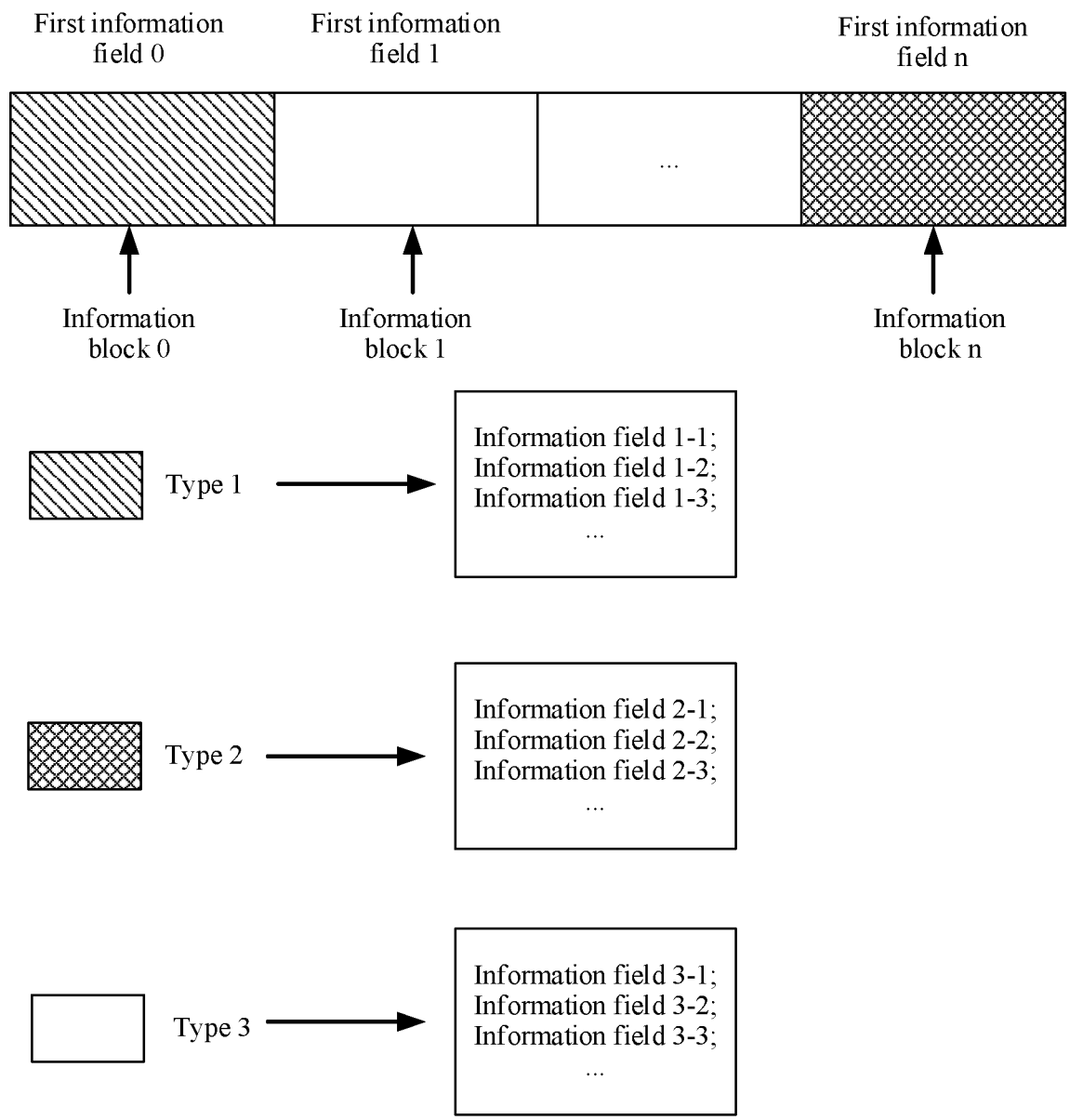
FIG. 5 is a schematic diagram of a format of group DCI according to an embodiment of this application.
Figure 6:
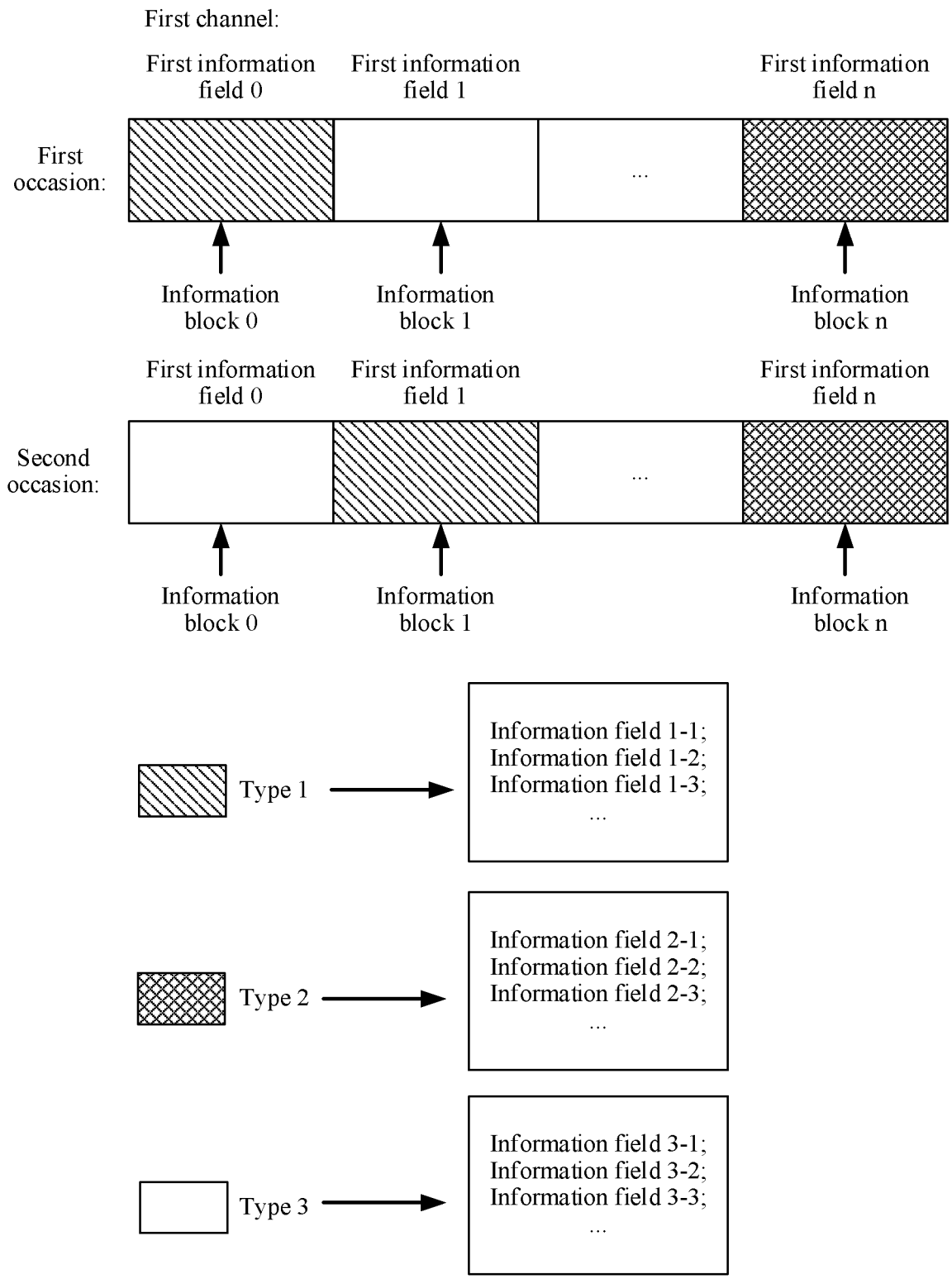
FIG. 6 is a schematic diagram of a format of group DCI according to an embodiment of this application.

On this basis, the embodiments of this application provide a communications method and apparatus, to resolve a problem of unnecessary energy consumption caused by monitoring a PDCCH by a terminal device when there is no data scheduling. In the embodiments of this application, the WUS/GTS may be designed as a terminal device group downlink control channel (UE Group PDCCH). The network device may send a common group PDCCH to a group of terminal devices. Information carried on the group PDCCH is group downlink control information (DCI). The group DCI may include a plurality of information blocks, each information block may correspond to one different terminal device in the group of terminal devices, each information block includes one first information field set, and the first information field set indicates information about detection performed on a PDCCH by a corresponding terminal device, for example, indicates the terminal device to "wake up" or "go to sleep", to implement the foregoing WUS or GTS functions. Types of first information field sets included in different information blocks in the group DCI are different, functions of different types of first information field sets are different, and information fields included in the different types of first information field sets are not completely the same, as shown in FIG. 5. Types of first information field sets included in information blocks that correspond to a same terminal device and that are in group DCI sent on different occasions are different, as shown in FIG. 6. The network device may determine, based on a data scheduling status or a DRX timer status of each terminal device, a type of a first information field set included in an information block corresponding to the terminal device. The method and the apparatus are based on a same inventive concept. Because a problem-resolving principle of the method is similar to that of the apparatus, mutual reference may be made to implementations of the apparatus and the method, and no repeated description is provided.

"A plurality of" mentioned in the embodiments of this application means two or more.

In addition, it should be understood that, in descriptions of the embodiments of this application, the words "first", "second", and the like are merely used for distinguishing descriptions, and shall not be understood as an indication or implication of relative importance, or an indication or implication of an order.

The following specifically describes the communications method provided in the embodiments of this application with reference to the accompanying drawings.

Figure 7A:
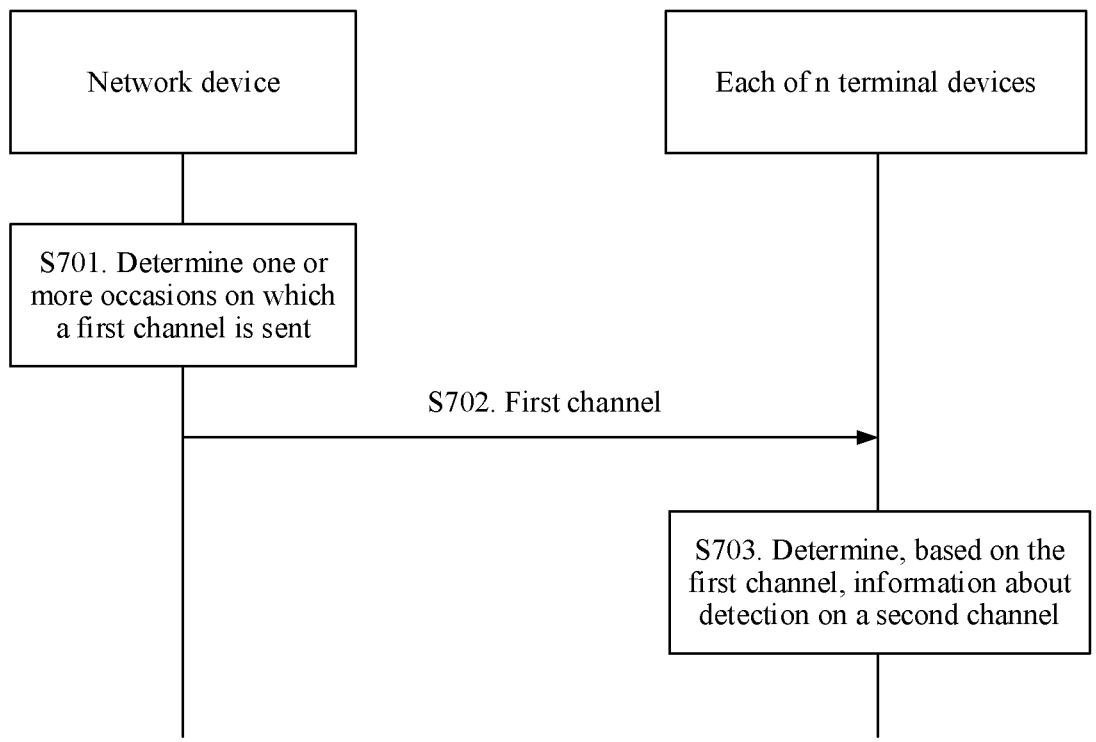
FIG. 7A is a schematic flowchart of a communications method according to an embodiment of this application.

FIG. 7A is a flowchart of a communications method according to this application. The communications method provided in this application may be applied to a network device, a chip or a chip set in a network device, or the like. The following provides descriptions by using an example in which the method is applied to a network device. The method includes the following steps.

S701. The network device determines one or more occasions on which a first channel is sent. For example, the first channel may be a group PDCCH.

For example, the network device may further determine one or more occasions on which a first signal is sent. The first signal may be a reference signal, or may be a power saving signal.

The occasion may be a slot in which a terminal device performs detection on the first channel.

S702. The network device sends the first channel or the first signal to the at least one terminal device, where n is an integer greater than 0. The first channel or the first signal carries first information. For example, the first information may be DCI, or the first information may be power saving information such as indication information indicating a terminal device to "wake up" or "go to sleep".

Figure 7B:
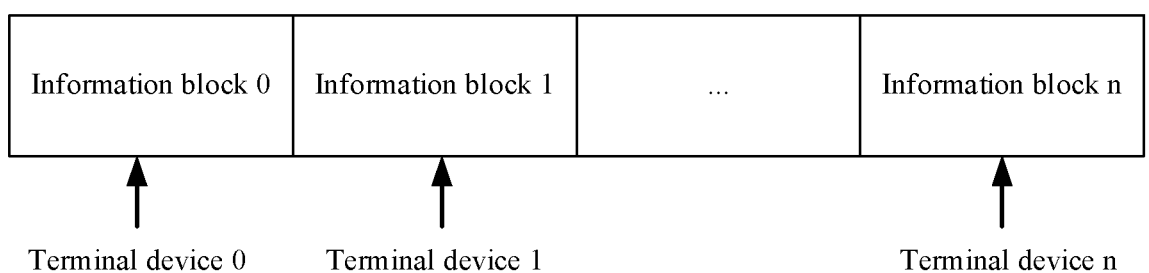
FIG. 7B is a schematic diagram of a format of a first channel according to an embodiment of this application.

The first information includes one or more information blocks, where each information block corresponds to one of the at least one terminal device, each information block corresponds to a different terminal device, each information block includes one first information field set, and the first information field set is used to indicate information (which may also be referred to as power saving information) about detection performed on a second channel by a terminal device corresponding to an information block in which the first information field set is located. For example, refer to FIG. 7B. The second channel may be a PDCCH, or may be a PDSCH. The first information may have at least one of the following two features.

Feature 1: If the one or more information blocks are two or more information blocks, types of first information field sets included in at least two information blocks in same first information are different. For example, refer to FIG. 5.

Feature 2: If the one or more occasions are two or more occasions, types of first information field sets included in information blocks that correspond to a same terminal device and that are in first information carried on first channels sent on at least two different occasions are different. For example, refer to FIG. 6. When the first channel is a PDCCH (for example, the group PDCCH), formats of first channels sent on different occasions may be the same.

It should be noted that functions of first information field sets of different types are different.

Usually, DCI formats of the first channel and the second channel are different.

As an example for description, types of the first information field set may include but are not limited to a type 1, a type 2, and a type 3.

If the first information field set is of the type 1, the first information field set may be used to indicate whether a terminal device performs detection on a second channel within one or more discontinuous reception DRX cycles after an occasion on which the first channel is detected.

Specifically, an information field included in the first information field set corresponding to the type 1 may include but is not limited to at least one of the following three information fields: an information field 1-1, an information field 1-2, and an information field 1-3.

The information field 1-1 may be a channel state information (CSI) request, used to indicate some configuration information of the terminal device for CSI reporting, namely, "CSI-ReportConfigs", for example, an associated CSI reference signal (CSI-RS) or tracking reference signal (TRS). The information field 1-1 may be used to trigger the terminal device to receive a reference signal to perform time-frequency synchronization or CSI measurement. Therefore, after receiving the information field 1-1, the terminal device may receive the corresponding CSI-RS or TRS to perform CSI measurement or time-frequency synchronization. After completing CSI measurement, the terminal device may feed back CSI to the network device. The CSI-RS/TRS may be associated with a bandwidth part (BWP), and the terminal device needs to receive the CSI-RS/TRS on the BWP. Therefore, the information field 1-1 may further indicate a BWP that needs to be activated by UE. The foregoing indication method is implicit indication, and the UE obtains, by using the BWP associated with the CSI-RS/TRS, the BWP that needs to be activated. If a BWP of the first channel detected by the terminal device is different from the BWP indicated by the information field 1-1, the terminal device may perform BWP switching.

Figure 7C:
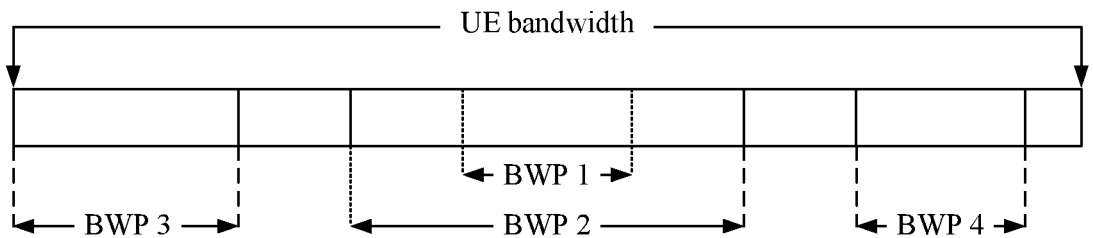
FIG. 7C is a schematic diagram of a BWP according to an embodiment of this application.

The network device may configure one or more downlink BWPs for the terminal device. The BWP includes physical resource blocks (PRB) consecutive in frequency domain, and the BWP is a subset of a bandwidth of the UE. A minimum granularity of the BWP in frequency domain is one PRB. The network device may configure one or more BWPs for the terminal device, and the BWPs may overlap in frequency domain, as shown in FIG. 7C. Optionally, the information field 1-1 may alternatively be BWP indication information, directly indicating an index number of a BWP.

The information field 1-2 may be a secondary cell (SCell) carrier activation indication, and is used to indicate a deactive/dormant SCell carrier or carrier set that needs to be activated to an active state by the terminal device. In a carrier aggregation (CA) situation, the network device configures a plurality of SCell carriers for the terminal device. The SCell carrier may have three states: active, deactive, and dormant. The terminal device can receive a physical downlink shared channel (PDSCH) only on an SCell carrier in the active state. When the network device indicates the terminal device to "wake up", the network device needs to transmit data to the terminal device. Therefore, the network device may need to convert some deactive/dormant SCell carriers of the terminal device into active SCell carriers.

The information field 1-3 may be used to indicate a DRX cycle in which detection on a PDCCH may be performed in a first time period, in other words, an "on duration" period in which detection on the PDCCH may be performed in the first time period, or may be used to indicate one or more slots in which detection on the PDCCH may be performed in the first time period. A quantity of bits in the information field may be configured by using higher layer signaling, and each bit may correspond to one or more slots in the corresponding time period. If the first time period is P slots and the quantity of bits is N, each bit may correspond to $\lfloor P/N \rfloor$ or $\lceil P/N \rceil$ slots in the time period.

Optionally, the first time period is a length of a detection cycle of the first channel, in other words, a length of a time interval between adjacent occasions of the first channel.

Figure 8:
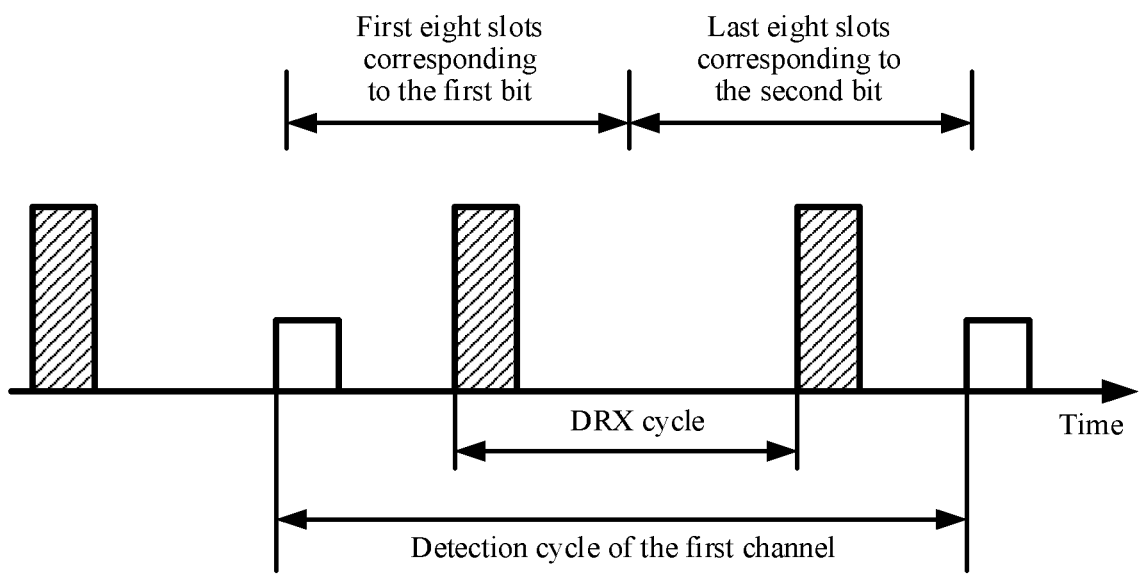
FIG. 8 is a schematic diagram of a function of a first channel according to an embodiment of this application.

For example, the detection cycle of the first channel is 16 slots, and the DRX cycle is 8 slots. Referring to FIG. 8, after the terminal device receives the first channel, start locations of two DRX cycles in the detection cycle of the first channel are located in the detection cycle of the first channel. The start location of the first DRX cycle is located in the first eight slots, and the start location of the second DRX cycle is located in the last eight slots. Therefore, the information field 1-3 may be 2 bits. The first bit may be used to indicate whether the terminal device performs detection on the PDCCH in an "on duration" period in the first DRX cycle. The second bit may be used to indicate whether the terminal device performs detection on the PDCCH in an "on duration" period in the second DRX cycle. Alternatively, the information field 1-3 may be 1 bit, used to indicate whether the terminal device performs detection on the PDCCH in the entire detection cycle of the first channel, in other words, whether the terminal device performs detection on the PDCCH in all "on duration" periods in the detection cycle.

Optionally, if the first time period is 16 slots, and the information field 1-3 is 2 bits, the first bit may indicate whether the terminal device performs detection on the PDCCH in the first eight slots of the first time period, and the second bit may indicate whether the terminal device performs detection on the PDCCH in the last eight slots of the first time period.

If the first information field set is of the type 2, for a function of the first information field set, refer to a function of a GTS signal. Specifically, the first information field set may be used to indicate whether a terminal device stops detection on a second channel in a period of time. The period of time may be a detection cycle of the first channel, or the period of time may be a sleep time. The sleep time (or sleep duration) may be configured by the network device for the at least one terminal device by using higher layer signaling. Alternatively, the detection information corresponding to the first information field set may be used to indicate whether a terminal device stops at least one timer in advance. The at least one timer may include at least one of a DRX-onDurationTimer, a DRX-InactivityTimer, a DRX-RetransmissionTimerDL, and a DRX-RetransmissionTimerUL.

In specific implementation, an information field included in the first information field set corresponding to the type 2 may include but is not limited to at least one of the following four information fields: an information field 2-1, an information field 2-2, an information field 2-3, and an information field 2-4.

The information field 2-1 may also indicate whether to stop a corresponding timer in advance, for example, a DRX timer that is currently used for timing, or all DRX timers, including any one of the DRX-onDurationTimer, the DRX-InactivityTimer, the DRX-RetransmissionTimerDL, and the DRX-RetransmissionTimerUL, related to an active time.

The information field 2-2 may be an SCell carrier deactivation or sleep indication, and is used to indicate an SCell carrier or carrier set whose state needs to be switched from active to deactive/dormant by the terminal device.

The information field 2-3 may be used to indicate a time period in which the terminal device does not perform detection on a PDCCH in a first time period, or may be used to indicate a time period in which the terminal device enters a "sleep" mode in a first time period.

Optionally, the information field 2-3 may be further used to indicate one or more slots in which detection on the PDCCH may not be performed in the first time period, or indicate one or more slots in which the terminal device enters the "sleep" mode in the first time period.

The indication manner is similar to the method in the descriptions about the information field 1-3, and details are not described herein again.

Optionally, the first time period may be a length of the detection cycle of the first channel, in other words, a length of a time interval between adjacent occasions of the first channel.

The information field 2-4 may directly indicate a length of a continuous time period in which the terminal device does not perform detection on a PDCCH, or a length of the sleep time (or sleep duration).

When the first information field set is of the type 3, the first information field set may be used to indicate whether a terminal device performs detection on a second channel within a DRX cycle including an occasion on which the first channel is detected, or whether a terminal device stops a first timer in advance. The first timer may be a DRX-onDurationTimer. When the terminal device enables the DRX-onDurationTimer, another DRX timer does not start timing.

Specifically, an information field included in the first information field set corresponding to the type 3 may include but is not limited to at least one of the following two information fields: an information field 3-1 and an information field 3-2. For details of the information field 3-1 and the information field 3-2, refer to descriptions of the information field 1-1 and the information field 1-3 in the first information field set corresponding to the type 1. Details are not described herein again.

Optionally, in this case, DRX indicated by the information field 3-1 includes the DRX cycle including the occasion of the first channel.

It should be noted that information fields included in first information field sets of a same type may be completely the same. Certainly, information fields included in first information field sets of a same type may not be completely the same. For example, a first information field set that is of the type 1 and that corresponds to a first terminal device includes an information field 1-1 and an information field 1-2, and a first information field set that is of the type 1 and that corresponds to a second terminal device includes an information field 1-1, an information field 1-2, and an information field 1-3.

Information fields included in first information field sets of different types are not completely the same.

In an example description, a quantity of bits in each first information field set may be the same, or a quantity of bits in each information block may be the same. The quantity of bits in the first information field set or the quantity of bits in the information block may be configured by the network device for the at least one terminal device by using higher layer signaling.

In specific implementation, the network device may further configure the detection cycle of the first channel for the at least one terminal device by using higher layer signaling. For example, the detection cycle of the first channel may be, but is not limited to, on a per-slot basis.

In a possible implementation, the network device may determine the first channel in the following manner. For any one of the at least one terminal device, the network device may determine, based on a data scheduling status of the terminal device that is obtained when the terminal device performs detection on the first channel and a DRX timer status of the terminal device, a type of a first information field set included in a corresponding information block.

Figure 9:
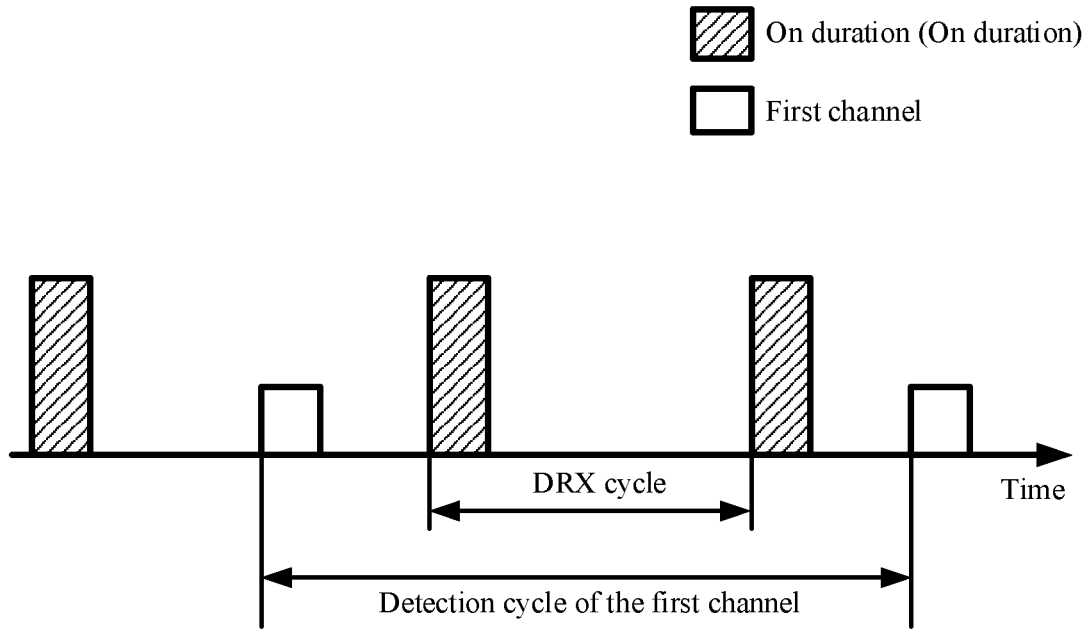
FIG. 9 is a schematic diagram of a state, of a DRX timer, existing when a first channel is detected according to an embodiment of this application.

In an example description, as shown in FIG. 9, the terminal device detects the first channel before a start location of "on duration" of a DRX cycle, that is, a start location of the DRX cycle. In one case, the UE is not in a DRX "active time" and no DRX timer (such as an inactivity timer) is enabled. The network device may determine that the first information field set included in the information block corresponding to the terminal device is of the type 1.

Further, the network device may determine a first information field, a second information field, and a third information field based on the data scheduling status obtained when the terminal device performs detection on the first channel.

Figure 10:
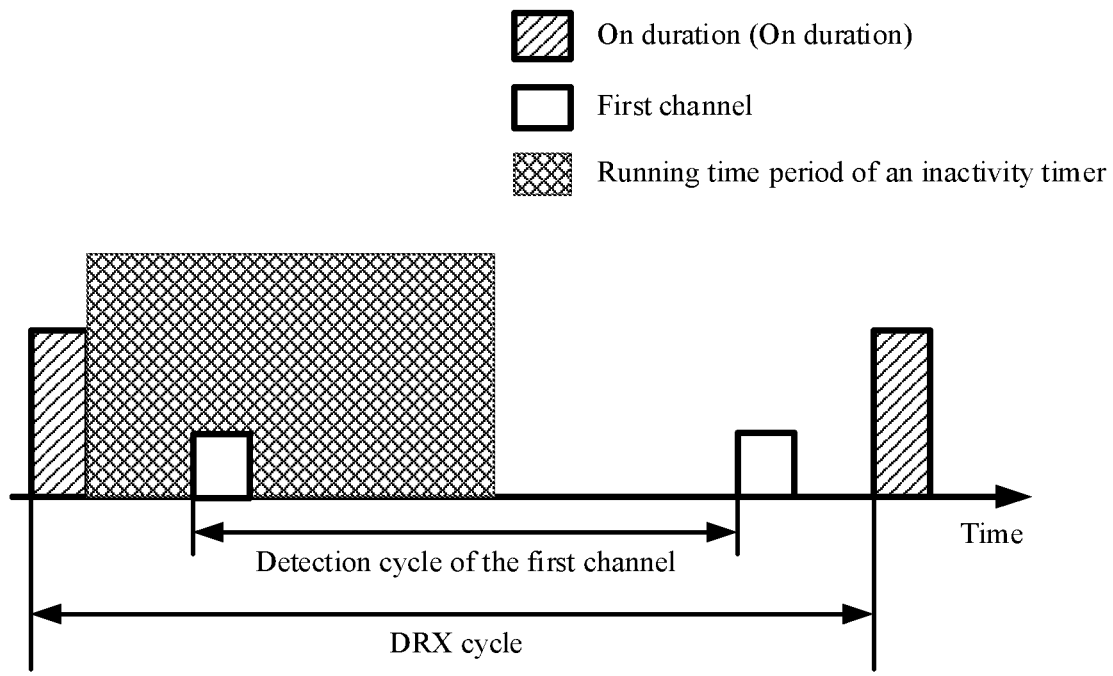
FIG. 10 is a schematic diagram of another state, of a DRX timer, existing when a first channel is detected according to an embodiment of this application.

If the terminal device detects the first channel within a running time period of a first DRX timer in a DRX cycle, and the first DRX timer may be the DRX-InactivityTimer, the DRX-RetransmissionTimerDL, or the DRX-RetransmissionTimerUL, the network device may determine that the first information field set included in the information block corresponding to the terminal device is of the type 2. For example, referring to FIG. 10, the first DRX timer may be the DRX-InactivityTimer.

Further, the network device may determine the information field 2-1, the information field 2-2, the information field 2-3, and the information field 2-4 based on the data scheduling status obtained when the terminal device performs detection on the first channel.

Figure 11:
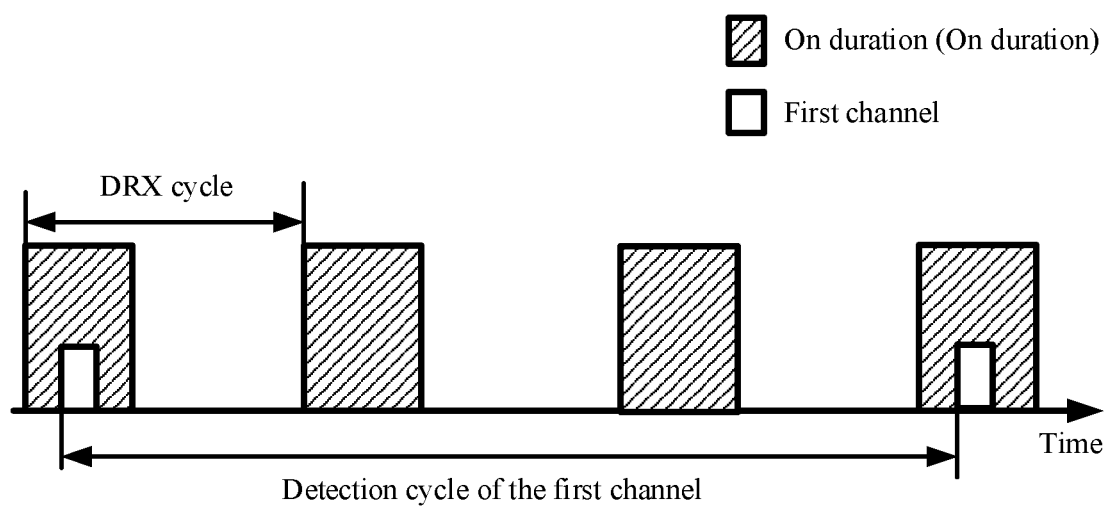
FIG. 11 is a schematic diagram of another state, of a DRX timer, existing when a first channel is detected according to an embodiment of this application.

As shown in FIG. 11, if the terminal device detects the first channel within on duration of a DRX cycle, and another DRX timer does not start timing, the network device may determine that the first information field set included in the information block corresponding to the terminal device is of the type 3.

Further, the network device may determine a first information field and a third information field based on the data scheduling status obtained when the terminal device performs detection on the first channel.

In addition, each information block may further include a second information field, and the second information field may be used to indicate a type of the first information field set.

Alternatively, the information block may not include a second information field, and the terminal device may determine a type of the first information field set based on a status of the terminal device. Examples are as follows.

State 1: The terminal device detects the first channel at the start location of the "on duration" in the DRX cycle, that is, before the start location of the DRX cycle, and the UE is not in the DRX "active time", as shown in FIG. 9. In this case, the terminal device may determine that the first information field set included in the information block corresponding to the terminal device on the first channel is of the type 1.

State 2: If the terminal device detects the first channel within the running time period of the first DRX timer in the DRX cycle, and the first DRX timer may be the DRX-InactivityTimer, the DRX-RetransmissionTimerDL, or the DRX-RetransmissionTimerUL, the terminal device may determine that the first information field set included in the information block corresponding to the terminal device on the first channel is of the type 2. For example, referring to FIG. 10, the first DRX timer may be the DRX-InactivityTimer.

State 3: If the terminal device detects the first channel within the on duration of the DRX cycle, and another DRX timer does not start timing, as shown in FIG. 11. In this case, the terminal device may determine that the first information field set included in the information block corresponding to the terminal device on the first channel is of the type 3.

There may be many terminal devices in a cell. Usually, the network device does not need to indicate "power saving" information of all terminal devices in the cell. For example, some terminal devices need to schedule a large amount of data in this case. In addition, a quantity of bits carried in the first information is also limited, and an excessively large quantity of bits affects coverage performance of the first channel, and increases complexity of performing detection on the first channel by a terminal device. Therefore, a quantity of information bit fields that can be supported by a quantity of source bits carried in the first information is limited (that is, a quantity of indicated terminal devices is limited).

Therefore, in an implementation, the network device may configure a same first channel for N terminal devices for detection. The at least one terminal device may be a part of or all of the N terminal devices. In addition, a quantity of the at least one terminal device may be less than or equal to a quantity of information blocks that can be carried in the first information, and the quantity of information blocks that can be carried in the first information may be less than or equal to N.

In specific implementation, if the network device does not need to indicate the N terminal devices to perform detection on downlink control channel information (or energy saving information), the quantity of information blocks carried in the first information is 0, and the quantity of the at least one terminal device may also be equal to 0.

In a possible implementation, the network device may send configuration information to the at least one terminal device by using higher layer signaling. The configuration information may indicate a location, in the first information, of an information block corresponding to each terminal device, for example, indicate a start location of a bit, in bits of the first information, of the information block corresponding to each terminal device.

In another possible implementation, the first information may further include a third information field, and the third information field is used to indicate a terminal device corresponding to an information block included in the first information, and/or a location, in the first information, of an information block corresponding to the at least one terminal device. The third information field may be located in a most significant bit on the first channel. Therefore, after a terminal device receives the first channel, if the third information field on the first channel indicates that the first information includes an information block corresponding to the terminal device, the terminal device may read the information block corresponding to the terminal device on the first channel.

The network device may configure one index number for each of the N terminal devices.

In an example description, the third information field may include N bits, and each bit may correspond to one of the N terminal devices. Therefore, a bit corresponding to a terminal device may be used to indicate whether the first channel includes an information block corresponding to the terminal device, and a location, on the first channel, of the information block corresponding to the terminal device may be indicated by using the bit. Optionally, bits in the third information field in descending order respectively correspond to terminal devices whose index numbers are sorted in ascending order (or in descending order). The network device may directly configure a correspondence between each bit in the third information field and an indicated terminal device, and each terminal device may directly determine, by using a bit value at a corresponding bit location in the third information field, whether the first information includes an information block corresponding to the terminal device. If the first information includes the information block corresponding to the terminal device, the terminal device may determine, based on the corresponding bit location in the third information field and a location of a bit that is in the third information field and that indicates the corresponding information block, the location of the information block that corresponds to the terminal device and that is in the first information. For example, the third information field includes 5 bits, the 5 bits in descending order sequentially correspond to a terminal device 2, a terminal device 4, a terminal device 1, a terminal device 5, and a terminal device 3, and bit values in the third information field are 01010. Therefore, the terminal device 4 determines, based on the bit value "1" of the second bit in the third information field, that the first information includes an information block corresponding to the terminal device 4, and the information block corresponding to the terminal device 4 is the first information block in descending order in the first information. Similarly, the terminal device 5 determines, based on the bit value "1" of the fourth bit in the third information field, that the first information includes an information block corresponding to the terminal device 5, and the information block corresponding to the terminal device 5 is the second information block in a descending order in the first information.

If the first information includes an information block corresponding to a terminal device, a corresponding bit of the terminal device in the third information field may be set to "1". If the first information does not include an information block corresponding to a terminal device, a corresponding bit of the terminal device in the third information field may be set to "0". Certainly, if the first information includes the information block corresponding to the terminal device, the corresponding bit of the terminal device in the third information field may also be set to "0". If the first information does not include the information block corresponding to the terminal device, the corresponding bit of the terminal device in the third information field may be set to "1".

Specifically, the third information field may be used to indicate an index number of the terminal device corresponding to the information block included in the first information, and a location, in the first information, of an information block corresponding to each terminal device may be determined based on an index number of each terminal device.

Figure 12:
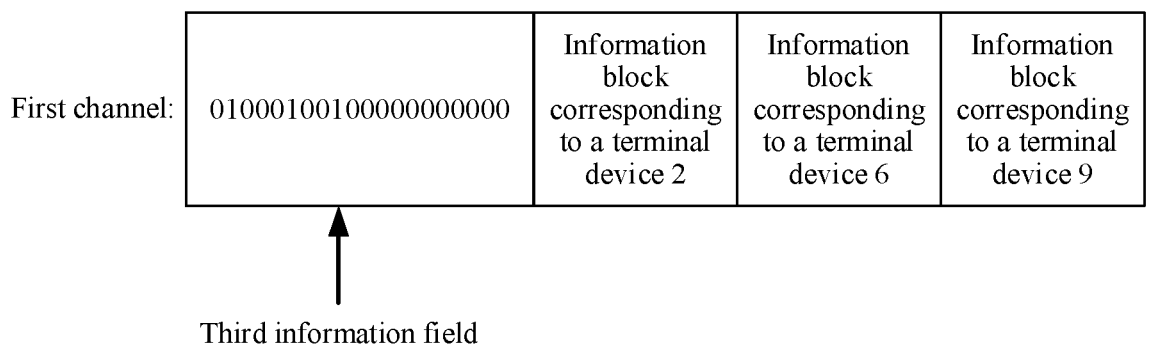
FIG. 12 is a schematic diagram of a format of a first channel according to an embodiment of this application.

For example, it is assumed that the network device configures a same first channel for 20 terminal devices, and index numbers of the 20 terminal devices are 1 to 20 successively. The third information field on the first channel includes 20 bits. The 20 bits in descending order respectively correspond to terminal devices whose index numbers are sorted in ascending order. To be specific, a most significant bit corresponds to a terminal device whose index number is 1, a second most significant bit corresponds to a terminal device whose index number is 2, a third most significant bit corresponds to a terminal device whose index number is 3, and so on. If the first channel includes information blocks corresponding to terminal devices whose index numbers are 2, 6, and 9, the third information field of the first channel may be "01000100100000000000". As shown in FIG. 12, the network device may sequentially include, in ascending order of index numbers, information blocks corresponding to the terminal devices whose index numbers are 2, 6, and 9 in bits in descending order on the first channel.

In another example description, the network device first groups N (for example, 20) UEs that perform detection on the same first channel, and each group includes K (for example, 5) terminal devices. Therefore, there are P1 (for example, 4) groups in total, and N>=P1*K. If a quantity of terminal devices that can be supported by a quantity of bits carried in the first information is M (for example, 10), a quantity of UE groups that can be supported on the first channel is P2 (for example, 2), where M>=P2*K, and P1>=P2. Each UE group has an index number, and the network device configures, for each terminal device by using higher layer signaling, a group index number of a UE group to which the terminal device belongs and an intra-group index number. An information field (for example, which is referred to as UE group index indication information) is added to the first channel, to indicate p (0<=p<=P1) UE groups of the P1 UE groups. That is, an information bit field of the p UE groups exists in the first channel. An indication manner of the information field is similar to that described above. Bits in descending order respectively correspond to UE groups whose index numbers are sorted in ascending order. If a bit in the information field indicates "1", the first channel includes information bit fields of all UEs in a UE group corresponding to the bit. The network device may configure values of N, K, and M for the N UEs by using higher layer signaling.

To be specific, the network device may configure, for each UE by using higher layer signaling, a group index number of a UE group to which the UE belongs and an index number of the UE in the UE group, and the third information field indicates that the first channel includes a UE group to which a terminal device corresponding to an information block belongs. The first information includes an information block of each terminal device in the UE group indicated by the third information field. If a terminal device does not have a corresponding first information field set, but the terminal device belongs to the UE group indicated by the third information field, a quantity of information blocks corresponding to the terminal device may be 0.

A quantity of bits in the third information field may be equal to $$\lceil \log_2(C_{P1}^0 + C_{P1}^1 + \ldots + C_{P1}^{P2}) \rceil.$$

To be specific, the information field indicates a possible combination of p selected UE groups from the P1 UE groups, a bit value of each information field corresponds to a combination of the UE groups, and a base station may configure a correspondence between a bit value of an information field and a combination of UE groups by using higher layer signaling. For example, if P1=4 and P2=2, the quantity of bits in the third information field may be determined to be equal to $\log_2 (C_4^0 + C_4^4 + C_4^2) = 4$. If group index numbers of four UE groups may be 1 to 4, and index numbers of five terminal devices included in each group are 1 to 5, the correspondence between a bit value of the third information field and a combination of UE groups may be shown in Table 1.

TABLE 1

| Bit value of the third information field | Combination of the UE groups | Bit value of the third information field | Combination of the UE groups |
|---|---|---|---|
| 0000 | 1 | 1000 | 2 and 4 |
| 0001 | 2 | 1001 | 3 and 4 |
| 0010 | 3 | 1010 | No group is indicated. |
| 0011 | 4 | 1011 | Reserved |
| 0100 | 1 and 2 | 1100 | Reserved |
| 0101 | 1 and 3 | 1101 | Reserved |
| 0110 | 1 and 4 | 1110 | Reserved |
| 0111 | 2 and 3 | 1111 | Reserved |

It should be understood that Table 1 is merely an example for description, and a correspondence between a quantity of bits in the third information field, a bit value of the third information field, and a combination of UE groups is not specifically limited.

Figure 13A:
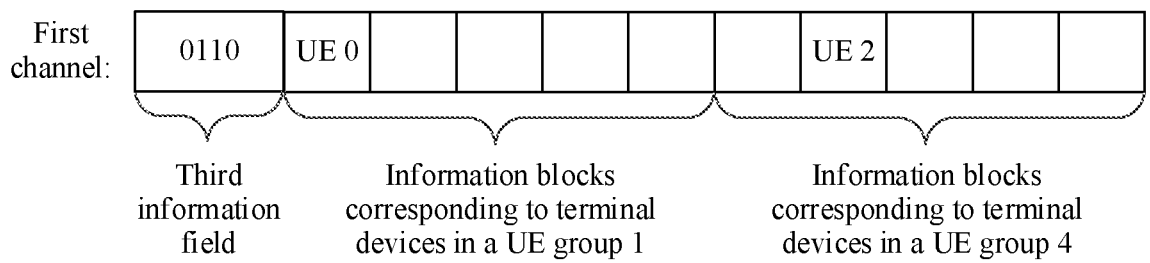
FIG. 13A is a schematic diagram of another format of a first channel according to an embodiment of this application.

Remaining bits of the first channel correspond to information bit fields of all UEs in the UE group indicated by the information field, and UE groups whose group indexes are in ascending order correspond to bits that are in descending order. For each UE in each UE group, information bit fields of UEs whose intra-group index numbers are in ascending order correspond to bits that are in descending order. The following uses an example for description. It is assumed that P1=4, group index numbers are 1 to 4, K=5, and intra-group index numbers are 1 to 5. If a group index number of UE 0 is 1, an intra-group index number of the UE 0 is 1, a group index number of UE 1 is 4, an intra-group index number of the UE 1 is 2, and UE groups indicated by the third information field are groups 1 and 4, locations of information blocks of the two UEs on the first channel are shown in FIG. 13A.

Figure 13B:
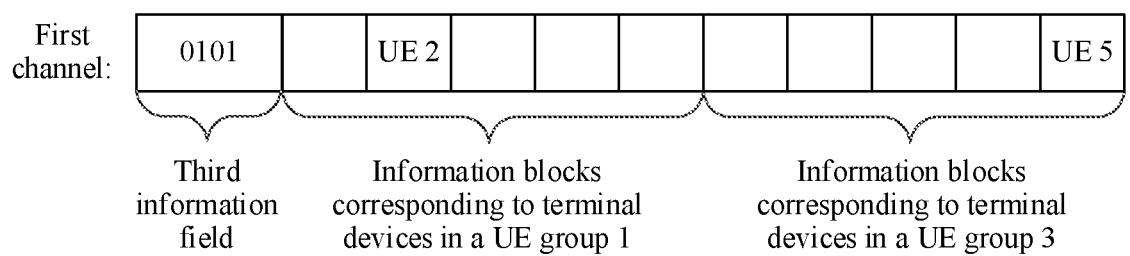
FIG. 13B is a schematic diagram of another format of a first channel according to an embodiment of this application.

If the network device sends the first channel to UE groups whose group index numbers are 1 and 3, the network device may set the third information field of the first channel to "0101". It is assumed that the first channel includes an information block corresponding to a terminal device whose index number is 2 in the UE group 1 and an information block corresponding to a terminal device whose index number is 5 in the UE group 3. For the first channel, refer to FIG. 13B.

In addition, Table 1 may also be used in a case in which grouping is not performed. To be specific, the network device preconfigures index numbers of the N UEs and a correspondence between a bit value of the third information field and a combination of terminal devices (for example, a combination of index numbers of the terminal devices). Therefore, after receiving the first channel, the terminal device determines, based on the bit value in the third information field, the terminal device corresponding to an information block included in the first information, to obtain the corresponding information block at a corresponding location, in the first information, of the terminal device. For example, the correspondence between a bit value of a third information field and a combination of terminal devices may be shown in Table 2. It should be understood that Table 2 is merely an example for description, and a correspondence between a quantity of bits in the third information field, a bit value of the third information field, and a combination of terminal devices is not specifically limited.

TABLE 2

| Bit value of the third information field | Combination of the terminal devices | Bit value of the third information field | Combination of the terminal devices |
| --- | --- | --- | --- |
| 0000 | 1 | 1000 | 2 and 4 |
| 0001 | 2 | 1001 | 3 and 4 |
| 0010 | 3 | 1010 | No group is indicated. |
| 0011 | 4 | 1011 | 1, 2, and 3 |
| 0100 | 1 and 2 | 1100 | 1, 2, and 4 |
| 0101 | 1 and 3 | 1101 | 2, 3, and 4 |
| 0110 | 1 and 4 | 1110 | 1, 3, and 4 |
| 0111 | 2 and 3 | 1111 | 1, 2, 3, and 4 |

Figure 13C:
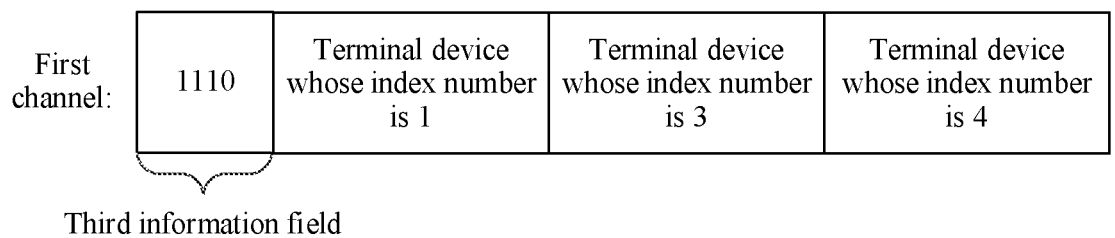
FIG. 13C is a schematic diagram of another format of a first channel according to an embodiment of this application.

The following uses an example for description. Terminal devices indicated by the third information field are terminal devices whose index numbers are 1, 3, and 4. In this case, for locations, on the first channel, of information blocks of the terminal devices whose index numbers are 1, 3, and 4, refer to FIG. 13C. An order of the information blocks may be arranged in descending order in the first information based on the indicated index numbers that are in ascending order.

S703. Each terminal device determines, based on the first channel, information about detection performed by the terminal device on a second channel.

This has been described above with reference to a specific structure of the first channel.

Figure 14:
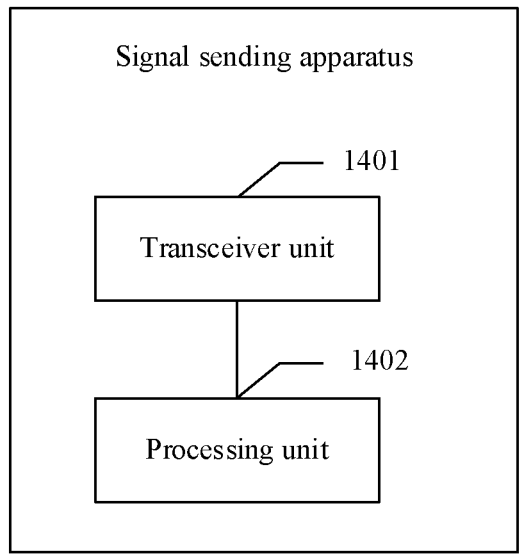
FIG. 14 is a schematic structural diagram of a communications apparatus according to an embodiment of this application.

Based on a same inventive concept as the method embodiments, an embodiment of this application provides a communications apparatus, specifically configured to implement the methods described in the embodiments in FIG. 5 to FIG. 13C. The device may be the communications apparatus, or may be a chip in the communications apparatus, a chip set in the communications apparatus, or a part that is of a chip in the communications apparatus and that is configured to perform a related method function. A structure of the communications apparatus may be shown in FIG. 14, and includes a transceiver unit 1401 and a processing unit 1402.

In an implementation, the communications apparatus may be a network device, and the processing unit 1402 is configured to determine one or more occasions on which the first channel is sent. The transceiver unit 1401 is configured to send, to at least one terminal device, the first channel on the one or more occasions determined by the processing unit 1402, where the first channel carries first information, and the first information includes one or more information blocks, where each information block corresponds to one of the at least one terminal device, each information block corresponds to a different terminal device, each information block includes one first information field set, and the first information field set is used to indicate information about detection performed on a second channel by a terminal device corresponding to an information block in which the first information field set is located; and if the one or more information blocks are two or more information blocks, types of first information field sets included in at least two information blocks in same first information are different; and/or if the one or more occasions are two or more occasions, types of first information field sets included in information blocks that correspond to a same terminal device and that are in first information carried on first channels sent on at least two different occasions are different.

For example, each information block may further include a second information field, and the second information field is used to indicate a type of the first information field set.

A quantity of bits in each first information field set may be the same, or a quantity of bits in each information block may be the same.

In an example description, when the first information field set is of a type 1, the first information field set may be used to indicate whether a terminal device performs detection on a second channel within one or more discontinuous reception (DRX) cycles after an occasion on which the first channel is detected.

In another example description, when the first information field set is of a type 2, the first information field set may be used to indicate whether a terminal device stops detection on a second channel in a period of time, or whether a terminal device stops at least one timer in advance.

In still another example description, when the first information field set is of a type 3, the first information field set may be used to indicate whether a terminal device performs detection on a second channel within a DRX cycle including an occasion on which the first channel is detected, or whether a terminal device stops a first timer in advance.

The first information may further include a third information field, and the third information field is used to indicate a terminal device corresponding to an information block included in the first information, and/or a location, in the first information, of an information block corresponding to the at least one terminal device.

Specifically, the third information field may be used to indicate an index number of the terminal device corresponding to the information block included in the first information, and a location, in the first information, of an information block corresponding to each terminal device is determined based on an index number of each terminal device.

The at least one terminal device may be a part of N terminal devices; and/or a quantity of the at least one terminal device may be less than or equal to a quantity of information blocks that can be carried in the first information, and the quantity of information blocks that can be carried in the first information may be less than or equal to N, where the N terminal devices perform detection on a same first channel.

In another implementation, the communications apparatus may be a terminal device.

The transceiver unit 1401 is configured to receive a first channel on one or more occasions from a network device, where the first channel carries first information, and the first information includes one or more information blocks, where each information block corresponds to one terminal device, each information block corresponds to a different terminal device, each information block includes one first information field set, and the first information field set is used to indicate information about detection performed on a second channel by a terminal device corresponding to an information block in which the first information field set is located; and if the one or more information blocks are two or more information blocks, types of first information field sets included in at least two information blocks in same first information are different; and/or if the one or more occasions are two or more occasions, types of first information field sets included in information blocks that correspond to a same terminal device and that are in first information carried on first channels sent on at least two different occasions are different. The processing unit 1402 is configured to determine, based on the first information received by the transceiver unit 1401, the information about detection performed on a second channel by the processing unit.

Each information block may further include a second information field, and the second information field is used to indicate a type of the first information field set.

For example, a quantity of bits in each first information field set may be the same, or a quantity of bits in each information block may be the same.

When the first information field set is of a type 1, the first information field set may be used to indicate whether a terminal device performs detection on a second channel within one or more discontinuous reception (DRX) cycles after an occasion on which the first channel is detected.

When the first information field set is of a type 2, the first information field set may be used to indicate whether a terminal device stops detection on a second channel in a period of time, or whether a terminal device stops at least one timer in advance.

When the first information field set is of a type 3, the first information field set may be used to indicate whether a terminal device performs detection on a second channel within a DRX cycle including an occasion on which the first channel is detected, or whether a terminal device stops a first timer in advance.

The first information may further include a third information field, and the third information field is used to indicate a terminal device corresponding to an information block included in the first information, and/or a location, in the first information, of an information block corresponding to a terminal device.

Specifically, the third information field may be used to indicate an index number of the terminal device corresponding to the information block included in the first information, and a location, in the first information, of an information block corresponding to each terminal device is determined based on an index number of each terminal device.

Division into modules in the embodiments of this application is an example, is only logical function division, and may be other division in an actual implementation. In addition, function modules in the embodiments of this application may be integrated into one processor, or may exist alone physically, or two or more modules may be integrated into one module. The integrated module may be implemented in a form of hardware, or may be implemented in a form of a software function module.

Figure 15:
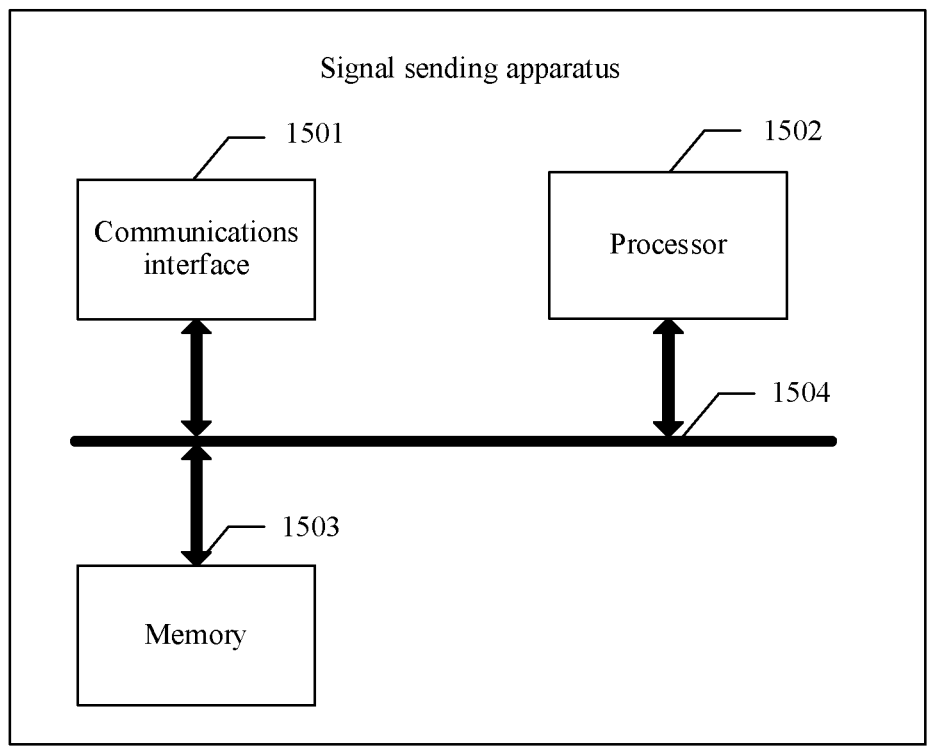
FIG. 15 is a schematic structural diagram of a communications apparatus according to an embodiment of this application.

When the integrated module may be implemented in a form of hardware, the communications apparatus may be shown in FIG. 15, and the processing unit 1402 may be a processor 1502. The processor 1502 may be a central processing module (central processing unit (CPU)), a digital processing module, or the like. The sending unit 1401 may be a communications interface 1501. The communications interface 1501 may be a transceiver, may be an interface circuit such as a transceiver circuit, may be a transceiver chip, or the like. The communications apparatus further includes a memory 1503, configured to store a program to be executed by the processor 1502. The memory 1503 may be a nonvolatile memory, for example, a hard disk (HDD) or a solid-state drive (SSD), or may be a volatile memory, for example, a random access memory (RAM). The memory 1503 is any other medium that can be configured to carry or store expected program code in a form of an instruction or a data structure and that can be accessed by a computer, but is not limited thereto.

The processor 1502 is configured to execute the program code stored in the memory 1503, and is specifically configured to perform an action of the processing unit 1402. Details are not described in this application again.

In this embodiment of this application, a specific connection medium between the communications interface 1501, the processor 1502, and the memory 1503 is not limited. In this embodiment of this application, the memory 1503, the processor 1502, and the communications interface 1501 are connected through a bus 1504 in FIG. 15, and the bus is represented by a thick line in FIG. 15. A connection manner between other components is schematically described, and is not limited herein. The bus may be classified into an address bus, a data bus, a control bus, and the like. For ease of representation, only one thick line is used to represent the bus in FIG. 15, but this does not mean that there is only one bus or only one type of bus.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of any other programmable data processing device to generate a machine, so that the instructions executed by a computer or the processor of any other programmable data processing device generate an apparatus for implementing a specific function in one or more processes in the flowcharts and/or in one or more blocks in the block diagrams.

The computer program instructions may be stored in a computer-readable memory that can indicate the computer or the other programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

The computer program instructions may be loaded onto the computer or the other programmable data processing device, so that a series of operations and steps are performed on the computer or the another programmable device, thereby generating computer-implemented processing. Therefore, the instructions executed on the computer or the other programmable device provide a step for implementing the specific function in one or more processes in the flowcharts and/or in one or more blocks in the block diagrams.

It is clear that a person skilled in the art can make various modifications and variations to the embodiments of this application without departing from the spirit and scope of the embodiments of this application. This application is intended to cover these modifications and variations to the embodiments of this application provided that they fall within the scope of protection defined by the following claims and their equivalent technologies.

What is claimed is:

1. A communications method, comprising:
   determining one or more occasions on which a first channel is to be sent; and
   sending the first channel on the one or more occasions to at least one terminal device, wherein the first channel carries first information, and the first information comprises one or more information blocks, wherein each information block corresponds to one of the at least one terminal device, each information block corresponds to a different terminal device, each information block comprises a first information field set used to indicate information about detection performed on a second channel by a terminal device corresponding to the information block in which the first information field set is located; and
   wherein the one or more information blocks include at least two information blocks, types of first information field sets comprised in the at least two information blocks in the same first information are different; or wherein the one or more occasions include at least two occasions, types of first information field sets comprised in information blocks that correspond to a same terminal device and that are in the first information carried on the first channel sent on the at least two different occasions are different;
   wherein the first information further comprises a third information field that indicates a terminal device corresponding to each of the at least two information blocks and a location of each of the at least two information blocks.

2. The method according to claim 1, wherein each information block further comprises a second information field, and the second information field is used to indicate a type of the first information field set.

3. The method according to claim 1, wherein a quantity of bits in each first information field set is the same or a quantity of bits in each information block is the same.

4. The method according to claim 1, wherein when the first information field set is of a first type, the first information field set is used to indicate whether a terminal device performs detection on a second channel within one or more discontinuous reception (DRX) cycles after an occasion on which the first channel is detected.

5. The method according to claim 1, wherein when the first information field set is of a second type, the first information field set is used to indicate whether a terminal device stops detection on a second channel in a period of time, or whether a terminal device stops at least one timer in advance.

6. A communications method, comprising:
   receiving a first channel on one or more occasions from a network device, wherein the first channel carries first information, and the first information comprises one or more information blocks, wherein each information block corresponds to one terminal device, each information block corresponds to a different terminal device, each information block comprises first information field set used to indicate information about detection performed on a second channel by a terminal device corresponding to the information block in which the first information field set is located, and
   wherein the one or more information blocks include at least two information blocks, types of first information field sets comprised in the at least two information blocks in the same first information are different; or wherein the one or more occasions are at least two occasions, types of first information field sets comprised in information blocks that correspond to a same terminal device and that are in the first information carried on the first channel sent on the at least two different occasions are different; and
   determining, based on the first information, the information about detection performed on a second channel by a terminal device,
   wherein the first information further comprises a third information field that indicates a terminal device corresponding to each of the at least two information blocks and a location of each of the at least two information blocks.

7. The method according to claim 6, wherein each information block further comprises a second information field, and the second information field is used to indicate a type of the first information field set.

8. The method according to claim 6, wherein a quantity of bits in each first information field set is the same or a quantity of bits in each information block is the same.

9. The method according to claim 6, wherein when the first information field set is of a first type, the first information field set is used to indicate whether a terminal device performs detection on a second channel within one or more discontinuous reception (DRX) cycles after an occasion on which the first channel is detected.

10. The method according to claim 6, wherein when the first information field set is of a second type, the first information field set is used to indicate whether a terminal device stops detection on a second channel in a period of time, or whether a terminal device stops at least one timer in advance.

11. A communications apparatus, comprising:
a processing circuit, configured to determine one or more occasions on which a first channel is sent; and
a transceiver circuit, configured to send, to at least one terminal device, the first channel on the one or more occasions determined by the processing circuit, wherein the first channel carries first information, and the first information comprises one or more information blocks;
wherein each information block corresponds to one of the at least one terminal device, each information block corresponds to a different terminal device, each information block comprises one first information field set used to indicate information about detection performed on a second channel by a terminal device corresponding to the information block in which the first information field set is located; and
wherein the one or more information blocks are at least two information blocks, types of first information field sets comprised in the at least two information blocks in the same first information are different; or wherein the one or more occasions are at least two occasions, types of first information field sets comprised in information blocks that correspond to a same terminal device and that are in the first information carried on the first channel sent on the at least two different occasions are different;
wherein the first information further comprises a third information field that indicates a terminal device corresponding to each of the at least two information blocks and a location of each of the at least two information blocks.

12. The apparatus according to claim 11, wherein each information block further comprises a second information field, and the second information field is used to indicate a type of the first information field set.

13. The apparatus according to claim 11, wherein a quantity of bits in each first information field set is the same or a quantity of bits in each information block is the same.

14. The apparatus according to claim 11, wherein when the first information field set is of a first type, the first information field set is used to indicate whether a terminal device performs detection on a second channel within one or more discontinuous reception (DRX) cycles after an occasion on which the first channel is detected.

15. The apparatus according to claim 11, wherein when the first information field set is of a second type, the first information field set is used to indicate whether a terminal device stops detection on a second channel in a period of time, or whether a terminal device stops at least one timer in advance.

16. A communications apparatus, comprising:
a transceiver circuit, configured to receive a first channel on one or more occasions from a network device, wherein the first channel carries first information, and the first information comprises one or more information blocks, wherein each information block corresponds to one terminal device, each information block corresponds to a different terminal device, each information block comprises one first information field set used to indicate information about detection performed on a second channel by a terminal device corresponding to the information block in which the first information field set is located, and
wherein the one or more information blocks are at least two information blocks, types of first information field sets comprised in the at least two information blocks in the same first information are different; or wherein the one or more occasions are at least two occasions, types of first information field sets comprised in information blocks that correspond to a same terminal device and that are in the first information carried on the first channel sent on the at least two different occasions are different; and
a processing circuit, configured to determine, based on the first information received by the transceiver circuit, the information about detection performed on a second channel by the processing circuit,
wherein the first information further comprises a third information field that indicates a terminal device corresponding to each of the at least two information blocks and a location of each of the at least two information blocks.

17. The apparatus according to claim 16, wherein each information block further comprises a second information field, and the second information field is used to indicate a type of the first information field set.

18. The apparatus according to claim 16, wherein a quantity of bits in each first information field set is the same or a quantity of bits in each information block is the same.

19. The apparatus according to claim 16, wherein when the first information field set is of a first type, the first information field set is used to indicate whether a terminal device performs detection on a second channel within one or more discontinuous reception (DRX) cycles after an occasion on which the first channel is detected.

20. The apparatus according to claim 16, wherein when the first information field set is of a second type, the first information field set is used to indicate whether a terminal device stops detection on a second channel in a period of time, or whether a terminal device stops at least one timer in advance.

* * * * *